US012671896B2

(12) United States Patent
Li

(10) Patent No.: US 12,671,896 B2
(45) Date of Patent: Jun. 30, 2026

(54) IMAGE PROCESSING METHOD AND ELECTRONIC DEVICE

(71) Applicant: HONOR DEVICE CO., LTD., Shenzhen (CN)

(72) Inventor: Jianrui Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 97 days.

(21) Appl. No.: 18/710,731

(22) PCT Filed: Apr. 26, 2023

(86) PCT No.: PCT/CN2023/090817
§ 371 (c)(1),
(2) Date: May 16, 2024

(87) PCT Pub. No.: WO2024/045661
PCT Pub. Date: Mar. 7, 2024

(65) Prior Publication Data
US 2025/0047974 A1    Feb. 6, 2025

(30) Foreign Application Priority Data

Aug. 29, 2022    (CN) .......................... 202211043255.7

(51) Int. Cl.
*H04N 23/65* (2023.01)
*H04N 23/63* (2023.01)
*H04N 23/667* (2023.01)

(52) U.S. Cl.
CPC ........... *H04N 23/65* (2023.01); *H04N 23/632* (2023.01); *H04N 23/667* (2023.01)

(58) Field of Classification Search
CPC .... H04N 23/65; H04N 23/632; H04N 23/667; H04N 23/60; H04N 5/00; H04N 23/651;
(Continued)

(56) References Cited

U.S. PATENT DOCUMENTS 9,667,867 B2 * 5/2017 Iqbal ..................... H04N 23/651
2015/0293575 A1 * 10/2015 Hampson ................ G06F 1/329
713/323
(Continued)

FOREIGN PATENT DOCUMENTS

CN    109379535 A    2/2019
CN    110633288 A    12/2019
(Continued)

*Primary Examiner* — Ahmed A Berhan
(74) *Attorney, Agent, or Firm* — Fish & Richardson P.C.

(57) ABSTRACT

Embodiments of this application provide an image processing method and an electronic device, and the method includes: in response to a first operation performed by a user, obtaining a first image, where the first image is an image on which image post-processing has not been performed; obtaining a power level of an electronic device; and when a preset condition is met, saving the first image, generating a first thumbnail, and establishing a correspondence between the first thumbnail and the first image, where the preset condition at least includes that the power level of the electronic device is less than a first preset power level threshold. The method can prolong battery life of an electronic device, and improve user experience.

19 Claims, 37 Drawing Sheets

(58) Field of Classification Search
CPC ..... H04N 23/95; G06F 1/1686; G06F 1/3215;
G06F 1/329; G06F 3/04817; G06F
3/0482; G06F 3/04845; G06F 1/3212
See application file for complete search history.

(56) References Cited

U.S. PATENT DOCUMENTS

2020/0228692  A1    7/2020  Wakamatsu et al.
2021/0006755  A1    1/2021  Kim et al.

FOREIGN PATENT DOCUMENTS

| CN | 110933294 | A | 3/2020 |
|----|-----------|---|--------|
| CN | 112822394 | A | 5/2021 |
| CN | 113873161 | A | 12/2021 |
| JP | 2003209737 | A | 7/2003 |
| JP | 2009111582 | A | 5/2009 |
| KR | 20000013063 | A | 3/2000 |

* cited by examiner

~
TO

CONT.
FROM

~

TO

CONT.
FROM

Aperture Night Portrait Photo Video Pro More

601

TO

CONT
FROM

Processing. Please wait...

TO

CONT.
FROM

~

~
TO

CONT.
FROM

TO

CONT.
FROM

TO

CONT.
FROM

Processing. Please wait...

TO

CONT.
FROM

~

CONT
FROM

Processing. Please wait...

TO

CONT.
FROM

TO

CONT.
FROM

CONT.
FROM

~

TO

CONT.
FROM

TO

CONT
FROM

TO

CONT
FROM

CONT.
FROM

IMAGE PROCESSING METHOD AND ELECTRONIC DEVICE

CROSS-REFERENCE TO RELATED APPLICATIONS

This application is a national stage of International Application No. PCT/CN2023/090817, filed on Apr. 26, 2023, which claims priority to Chinese Patent Application No. 202211043255.7, filed on Aug. 29, 2022. The disclosures of the aforementioned applications are hereby incorporated by reference in their entireties.

TECHNICAL FIELD

This application relates to the field of electronic technologies, and specifically, to an image processing method and an electronic device.

BACKGROUND

Currently, electronic devices have been conventionally equipped with cameras. However, a process in which a camera shoots a photo and processes the photo consumes relatively large power, which affects battery life of an electronic device. Especially when a power level of the electronic device is relatively low, using the camera to shoot a photo further shortens the battery life and degrades user experience.

SUMMARY

This application provides an image processing method, an apparatus, an electronic device, a chip, a computer-readable storage medium, and a computer program product, to prolong battery life of an electronic device and improve user experience.

According to a first aspect, this application provides an image processing method. The method is performed by an electronic device and the method includes: in response to a first operation performed by a user, obtaining a first image, where the first image is an image on which image post-processing has not been performed; obtaining a power level of the electronic device; and when a preset condition is met, saving the first image, generating a first thumbnail, and establishing a correspondence between the first thumbnail and the first image, where the preset condition at least includes that the power level of the electronic device is less than a first preset power level threshold.

Optionally, when the preset condition is not met, the first image is processed, to obtain a second image, a second thumbnail is generated, and a correspondence between the second thumbnail and the second image is established.

The first operation may be a photo shooting operation. The first image is an initial image. The first image may be an image generated by performing preliminary processing, such as registration or decoding, by an image signal processor, on an original image obtained through shooting by a camera of the electronic device. Image post-processing has not been performed on the first image. The second image is an image on which image post-processing has been performed, that is, a finished image.

Optionally, the first thumbnail may be a thumbnail generated based on the first image. The second thumbnail may be a thumbnail generated based on the second image. The first preset power level threshold may be, for example, 20% of a total battery capacity of the electronic device. That the power level of the electronic device is less than a first preset power level threshold indicates that the power level of the electronic device is relatively low.

In the foregoing image processing method provided by the first aspect, after the first image is obtained in response to the first operation performed by the user, when the power level of the electronic device is less than the first preset power level threshold, that is, when the power level of the electronic device is relatively low, the first image is directly saved and image post-processing is not performed. In this way, power consumption can be reduced, battery life of the electronic device can be prolonged, and user experience can be improved.

In a possible implementation, before the saving the first image, generating a first thumbnail, and establishing a correspondence between the first thumbnail and the first image, the method further includes: determining user habit information, where the user habit information is used to represent whether the user is accustomed to viewing an obtained image within preset duration after shooting is completed, and the preset condition further includes that the user habit information is first information, where the first information is used to represent that the user is not accustomed to viewing an obtained image within the preset duration after shooting is completed.

The first information is second user habit information in Description of Embodiments.

Optionally, if the power level of the electronic device is less than the preset power level threshold, but the user habit information is second information, the first image is processed, to obtain a second image, a second thumbnail is generated, and a correspondence between the second thumbnail and the second image is established. The second information is used to represent that the user is accustomed to viewing an obtained image within the preset duration after shooting is completed. The second information is first user habit information in Description of Embodiments.

In this implementation, after the first image is obtained in response to the first operation performed by the user, when the power level of the electronic device is less than the first preset power level threshold and the user habit information is the first information, that is, when the power level of the electronic device is relatively low and the user is not accustomed to viewing a shot photo immediately after shooting is completed, the first image is directly saved and image post-processing is not performed. In this way, a use habit of the user is further considered while power consumption is reduced and battery life of the electronic device is prolonged, so that user experience is further improved.

In a possible implementation, the determining user habit information includes: dividing a preset historical time period into n time sub-periods, where n is an integer greater than 1; determining a quantity of target time periods in the n time sub-periods, where a ratio of a first quantity corresponding to the target time period to a second quantity corresponding to the target time period is greater than a first preset ratio, the first quantity corresponding to the target time period is a quantity of images whose shooting times are within the target time period and whose time intervals between times at which the images are initially viewed and shooting times are less than the preset duration, and the second quantity corresponding to the target time period is a total quantity of images whose shooting times are within the target time period; and if a ratio of the quantity of target time periods to n is less than or equal to a second preset ratio, determining that the user habit information is the first information; or if a ratio of the quantity of target time periods to n is greater than the second preset ratio, determining that the user habit information is the second information, where the second information is used to represent that the user is accustomed to viewing an obtained image within the preset duration after shooting is completed.

The first quantity is a quantity of immediately viewed images in Description of Embodiments, and the second quantity is a total quantity of shot images in Description of Embodiments. The first preset ratio is a preset ratio in Description of Embodiments, and the second preset ratio is equivalent to a preset proportion in Description of Embodiments.

In this implementation, the ratio of the first quantity corresponding to the target time period to the second quantity corresponding to the target time period is greater than the first preset ratio, that is, the target time period is a time period in which a probability of viewing an obtained image by the user immediately after shooting is completed is relatively high. That the ratio of the quantity of target time periods to n is greater than the second preset ratio indicates that the user is accustomed to viewing an obtained image immediately after shooting is completed. Therefore, the user habit information can be accurately determined by using a situation of the ratio of the quantity of target time periods to n, so as to be more consistent with the user habit during image processing and user experience can be further improved.

In a possible implementation, the determining a quantity of target time periods in the n time sub-periods includes: performing first processing on each time sub-period to obtain a processing result corresponding to each time sub-period, where the processing result includes that a time sub-period is the target time period, or that a time sub-period is not the target time period; and counting, based on the processing result corresponding to each time sub-period, the quantity of target time periods in the n time sub-periods, where the first processing includes: counting a total quantity of images whose shooting times are in a first time sub-period to obtain a second quantity corresponding to the first time sub-period, where the first time sub-period is any one of the n time sub-periods: obtaining times at which the images whose shooting times are within the first time sub-period are initially viewed: determining a quantity of images whose shooting times are within the first time sub-period and whose time intervals between times at which the images are initially viewed and shooting times are less than the preset duration, to obtain a first quantity corresponding to the first time sub-period; and if a ratio of the first quantity corresponding to the first time sub-period to the second quantity corresponding to the first time sub-period is greater than the first preset ratio, determining that the first time sub-period is the target time period.

In a possible implementation, after the saving the first image, generating a first thumbnail, and establishing a correspondence between the first thumbnail and the first image, the method further includes: receiving a second operation performed by the user on the first image; and if a type of the second operation is one of preset types, performing image post-processing on the first image to obtain a second image, and processing the second image based on the type of the second operation: or if a type of the second operation is not any one of the preset types, processing the first image based on the type of the second operation.

In a possible implementation, the preset type includes at least one of a viewing operation, a sharing operation, a moving operation, a copying operation, and an editing operation.

Correspondingly, the processing the second image based on the type of the second operation includes: if the preset type is the viewing operation, displaying the second image: if the preset type is the sharing operation, transmitting the second image to a target device or uploading the second image to a network in a transmission manner selected by the user; if the preset type is the moving operation, moving the second image from a current storage location to another storage location, if the preset type is the copying operation, copying the second image and saving a copied second image to a target storage location; or if the preset type is the editing operation, performing editing, including but is not limited to splicing, compositing, adding content to the image, changing content in the image, or the like, on the second image.

Optionally, if the type of the second operation is a deleting operation, the first image is directly deleted.

In other words, in this implementation, if the user performs an operation of the preset type on the initial image on which image post-processing has not been performed, image post-processing is first performed on the initial image, and then corresponding processing is performed based on a finished image on which image post-processing has been performed. Otherwise, corresponding processing is directly performed based on the initial image. The operation of the preset type may be understood as an operation that is performed when the user has a use requirement for the image.

In this implementation, when the user has a use requirement for the first image, post-processing is performed on the image and then corresponding processing is performed. In this way, a processing effect of the image can be improved, a use requirement of the user can be met, and user experience can be improved.

In a possible implementation, the method further includes: displaying third information in a process of performing image post-processing on the second image, where the third information is used to represent that image post-processing is being performed on the first image.

The third information may be image information, or may be text information. For example, the third information may be a text of "Processing. Please wait", a dynamically displayed processing progress bar, or the like. In other words, the third information is used to represent that the first image is in a state in which image post-processing is being performed. The third information can inform the user that the image is currently being processed and improve interaction with the user, so that user experience can be improved.

In a possible implementation, the receiving a second operation performed by the user on the first image includes: displaying the first thumbnail; and receiving the second operation performed by the user on the first thumbnail.

In a possible implementation, after the performing image post-processing on the first image to obtain a second image, the method further includes: saving the second image, generating a second thumbnail, and establishing a correspondence between the second thumbnail and the second image.

In this implementation, after image post-processing is performed on the first image, a generated second image is saved, the second thumbnail is generated, and the correspondence between the second thumbnail and the second image is established. In this way, it is convenient for the user to subsequently use, by using the second thumbnail, the second image on which image post-processing has been performed, and user experience is improved.

In a possible implementation, after the saving the second image, generating a second thumbnail, and establishing a correspondence between the second thumbnail and the second image, the method includes: deleting the first image and the first thumbnail. In this way, memory of an electronic device can be saved, a case in which a user uses an image in disorder can be prevented, and user experience can be improved.

In a possible implementation, after the saving the first image, generating a first thumbnail, and establishing a correspondence between the first thumbnail and the first image, the method further includes: performing image post-processing on the first image to obtain the second image, when it is detected that the electronic device starts charging, or that the power level of the electronic device is greater than a second preset power level threshold, or that the electronic device is in a charging state and the power level of the electronic device is greater than a third preset power level threshold.

Optionally, the second preset power level threshold may be the same as the third preset power level threshold or different from the third preset power level threshold.

In this implementation, when it is detected that the electronic device starts charging, or the power level of the electronic device is greater than the second preset power level threshold, image post-processing on the first image is started, to generate the second image. In other words, after the electronic device starts charging or after the electronic device has a relatively high enough power level, image post-processing is performed on the first image in a timely manner. In this way, when the user uses the image, an effect of the image can be ensured, and user experience can be improved.

When the electronic device is in a charging state and the power level of the electronic device is greater than the third preset power level threshold, image post-processing on the first image is started, to generate the second image. In this way, in a scenario in which the power level of the electronic device is low, but a charging condition of the user is limited and the electronic device cannot be charged to a high enough power level, post-processing on the first image is not started, so that power is saved, battery life of the electronic device is prolonged, and user experience is improved.

According to a second aspect, this application provides an apparatus. The apparatus is included in an electronic device, and the apparatus has a function of implementing actions of the electronic device in the foregoing first aspect and possible implementations of the foregoing first aspect. The function may be implemented by hardware, or may be implemented by executing corresponding software by hardware. The hardware or the software includes one or more modules or units corresponding to the function, for example, a receiving module or unit, and a processing module or unit.

According to a third aspect, this application provides an electronic device. The electronic device includes a processor, a memory, and an interface. The processor, the memory, and the interface cooperate with each other, to enable the electronic device to perform any one of the methods in the technical solutions of the first aspect.

According to a fourth aspect, this application provides a chip, and the chip includes a processor. The processor is configured to read and execute a computer program stored in a memory, to perform the method in any one of the first aspect and the possible implementations of the first aspect.

Optionally, the chip further includes a memory, and the memory is connected to the processor by using a circuit or a wire.

Further, optionally, the chip further includes a communication interface.

According to a fifth aspect, this application provides a computer-readable storage medium. The computer-readable storage medium stores a computer program, and when the computer program is executed by a processor, the processor is enabled to perform any one of the methods in the technical solutions in the first aspect.

According to a sixth aspect, this application provides a computer program product. The computer program product includes computer program code, and when the computer program code is run on an electronic device, the electronic device is enabled to perform any one of the methods in the technical solutions in the first aspect.

DESCRIPTION OF EMBODIMENTS

The following describes technical solutions in embodiments of this application with reference to accompanying drawings in embodiments of this application. In descriptions in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application. "a plurality of" represents two or more.

The terms "first", "second", and "third" mentioned below are merely intended for a purpose of description, and shall not be understood as an indication or implication of relative importance or implicit indication of a quantity of indicated technical features. Therefore, a feature limited by "first", "second", or "third" may explicitly or implicitly include one or more features.

Referring to "one embodiment", "some embodiments", or the like that is described in this specification of this application means that a specific characteristic, structure, or feature described in combination with the embodiment is included in one or more embodiments of this application. Therefore, the statements such as "in one embodiment", "in some embodiments", "in other embodiments", and "in some other embodiments" that appear at different places in this specification of this application do not necessarily refer to the same embodiment, but mean "one or more but not all embodiments", unless otherwise particularly emphasized in other ways. The terms "include", "comprise", "have", and variants thereof all mean "include but are not limited to", unless otherwise specifically emphasized in another manner.

An application scenario of the method is first described before an image processing method provided in embodiments of this application is described in detail.

Figure 1:
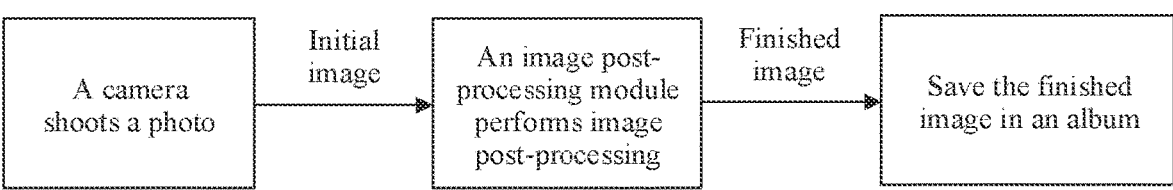
FIG. 1 is a schematic diagram of a photo shooting and photo processing process according to an embodiment of this application.

Generally, a process of shooting a photo (that is, an image) and processing a photo by a camera of an electronic device is shown in FIG. 1. The process includes: The camera shoots a photo to generate an initial image (also referred to as an image source file, a source file image, or the like), and then an image post-processing module performs image post-processing on the initial image to generate a finished image. Finally, the finished image is saved in an album.

In the foregoing process, power consumption of image post-processing performed by the electronic device on one initial image is approximately 1.25 mA·h. The power consumption is relatively large and affects battery life of the electronic device. Especially when a power level of the electronic device is relatively low, the battery life of the electronic device is further shortened, and user experience is affected.

In view of this, an embodiment of this application provides an image processing method. In the image processing method, when a power level of an electronic device is relatively low, an image post-processing process is delayed, to reduce power consumption, improve battery life of the electronic device, and improve user experience.

The image processing method provided in embodiments of this application may be applied to an electronic device that can install a camera application (application, app) such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). The image processing method provided in embodiments of this application may alternatively be applied to an electronic device that is configured to implement photo shooting such as a digital camera. A specific type of the electronic device is not limited in embodiments of this application.

Figure 2:
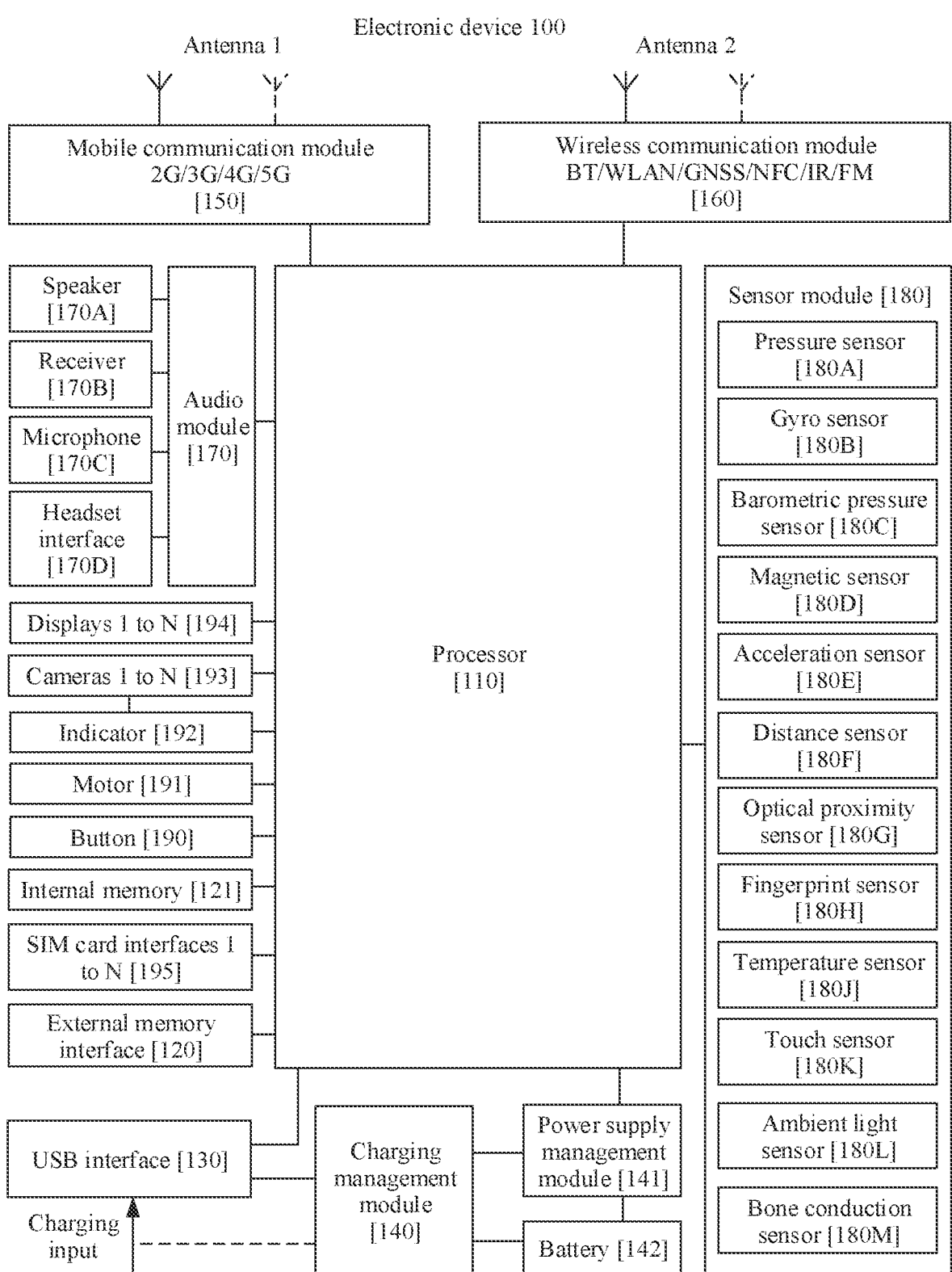
FIG. 2 is a schematic diagram of a structure of an electronic device 100 according to an embodiment of this application.

For example, FIG. 2 is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power supply management module 141, a battery 142, an antenna 1, an antenna 2, a mobile communication module 150, a wireless communication module 160, and an audio module 170, a speaker 170A, a receiver 170B, a microphone 170C, a headset interface 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application constitutes no specific limitation on the electronic device 100. In some other embodiments of this application, the electronic device 100 may include more or fewer components than those shown in the figure, or some components may be combined, or some components may be divided, or different component arrangements may be used. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110 and is configured to store instructions and data. In some embodiments, the memory in the processor 110 is a cache memory. The memory may save instructions or data recently used or cyclically used by the processor 110. If the processor 110 needs to use the instructions or data again, the instructions or data may be directly invoked from the memory. This avoids repeated access, reduces waiting time of the processor 110, and improves system efficiency.

In some embodiments, the processor 110 may include one or more interfaces. The interface may include an inter-integrated circuit (Inter-Integrated Circuit. I2C) interface, an inter-integrated circuit sound (Inter-integrated Circuit Sound, I2S) interface, a pulse code modulation (Pulse Code Modulation, PCM) interface, a universal asynchronous receiver/transmitter (universal asynchronous receiver/transmitter, UART) interface, a mobile industry processor interface (Mobile Industry Processor Interface, MIPI), a general-purpose input/output (General-Purpose Input/Output, GPIO) interface, a subscriber identity module (Subscriber Identity Module, SIM) interface, a universal serial bus (Universal Serial Bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is typically configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 and the camera 193 communicate with each other through the CSI interface, to implement a shooting function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module

160, the audio module 170, the sensor module 180, and the like. The GPIO interface may alternatively be configured as an I2C interface, an I2S interface, a UART interface, a MIPI interface, or the like.

The USB interface 130 is an interface that conforms to a USB standard specification, and may be specifically a mini USB interface, a micro USB interface, a USB type-C interface, or the like. The USB interface 130 may be configured to connect to the charger to charge the electronic device 100, or may be configured to transmit data between the electronic device 100 and a peripheral device, or may be configured to connect to a headset to play audio through the headset. The interface may alternatively be configured to connect to another electronic device, for example, an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may supply power to the electronic device by the power supply management module 141 while charging the battery 142.

The power supply management module 141 is configured to connect to the battery 142, the charging management module 140, and the processor 110. The power supply management module 141 receives an input from the battery 142 and/or the charging management module 140, and supplies power to the processor 110, the internal memory 121, the external memory, the display 194, the camera 193, the wireless communication module 160, and the like. The power supply management module 141 may be further configured to monitor parameters such as a battery capacity, a quantity of battery cycles, and a battery health status (power leakage and impedance). In some other embodiments, the power supply management module 141 may alternatively be disposed in the processor 110. In some other embodiments, the power supply management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, and the baseband processor, and the like.

The antenna 1 and the antenna 2 are configured to transmit and receive an electromagnetic wave signal. Structures of the antenna 1 and the antenna 2 in FIG. 2 are merely examples. Each antenna in the electronic device 100 may be configured to cover one or more communication frequency bands. Different antennas may be multiplexed to improve utilization of the antennas. For example, the antenna 1 may be multiplexed as a diversity antenna in a wireless local area network. In some other embodiments, the antennas may be used with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communication module 150 or another functional module.

The wireless communication module 160 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access. WCDMA), time-division code division multiple access (time-division code division multiple access. TD-SCDMA), long term evolution (long term evolution, LTE), BT, a GNSS, a WLAN, NFC. FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 implements a display function through the GPU, the display 194, the application processor, and the like. The GPU is a microprocessor for image processing, and is connected to the display 194 and the application processor. The GPU is configured to perform mathematical and geometric calculations and graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include 1 or N displays 194, where N is a positive integer greater than 1.

The electronic device 100 may implement a photographing function through the camera 193, the ISP, the video codec, the GPU, the display 194, the application processor, and the like.

The ISP is configured to handle data returned by the camera 193. For example, during photo shooting, a shutter is opened, light is transferred to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An optical image is generated for an object through the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include 1 or N cameras 193, where N is a positive integer greater than 1.

The digital signal processor is configured to process a digital signal. In addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more types of video codecs. In this way, the electronic device 100 may play or record videos in a plurality of encoding formats, such as moving picture experts group (moving picture experts group, MPEG)-1, MPEG-2, MPEG-3, and MPEG-4.

The NPU is a neural-network (neural-network, NN) computing processor, and quickly processes input information by referring to a biological neural network structure such as a mode of transmission between human brain neurons, and may further constantly perform self-learning. Applications such as intelligent cognition of the electronic device 100, for example, image recognition, face recognition, speech recognition, and text understanding, may be implemented by using the NPU.

The external memory interface 120 may be configured to connect to an external memory card, for example, a Micro SD card, to extend a storage capability of the electronic device 100. The external memory card communicates with the processor 110 through the external memory interface 120, to implement a data storage function. For example, music files, video files, and other files are saved in the external memory card.

The internal memory 121 may be configured to store computer-executable program code, and the executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (such as a sound playback function and an image playback function), and the like. The data storage area may store data (such as audio data and a phone book) and the like created during use of the electronic device 100. In addition, the internal memory 121 may include a high-speed random access memory, and may further include a non-volatile memory, for example, at least one magnetic disk storage device, a flash memory device, or a universal flash storage (universal flash storage, UFS).

The electronic device 100 may use the audio module 170, the speaker 170A, the receiver 170B, the microphone 170C, the headset interface 170D, the application processor, and the like to implement an audio function, for example, music playing and recording.

The audio module 170 is configured to convert digital audio information into an analog audio signal for output, and is also configured to convert an analog audio input into a digital audio signal. The audio module 170 may be further configured to encode and decode the audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may be configured to listen to music or answer a call in a hands-free mode through the speaker 170A.

The receiver 170B, also referred to as an "earpiece", is configured to convert an audio electrical signal into a sound signal. When the electronic device 100 is configured to answer a call or receive voice information, the receiver 170B may be put close to a human ear to receive a voice.

The microphone 170C, also referred to as a "voice tube" or a "mike", is configured to convert a sound signal into an electrical signal. When making a call or sending voice information, a user may make a sound by approaching a mouth to the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function, and the like.

The headset interface 170D is configured to be connected to a wired headset. The headset interface 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display 194. There are a plurality of types of pressure sensors 180A, such as a resistive pressure sensor, an inductive pressure sensor, and a capacitive pressure sensor. The capacitive pressure sensor may include at least two parallel plates having conductive materials. When a force is applied to the pressure sensor 180A, capacitance between electrodes changes. The electronic device 100 determines pressure intensity based on a capacitance change. When a touching operation is performed on the display 194, the electronic device 100 detects strength of the touching operation by using the pressure sensor 180A. The electronic device 100 may further calculate a touch position based on a detection signal of the pressure sensor 180A. In some embodiments, touching operations performed at a same touch position but having different touching operation strength may correspond to different operation instructions. For example, when a touching operation whose touching operation strength is less than a first pressure threshold is performed on a Messages application icon, an instruction for viewing an SMS message is performed. When a touching operation whose touching operation strength is greater than or equal to a first pressure threshold is performed on a Messages application icon, an instruction for creating a new SMS message is performed.

The gyro sensor 180B may be configured to determine a motion posture of the electronic device 100. In some embodiments, angular velocities of the electronic device 100 around three axes (that is, an x axis, a y axis, and a z axis) may be determined by using the gyro sensor 180B. The gyro sensor 180B may be configured to implement image stabilization during photographing. For example, when a shutter is pressed, the gyro sensor 180B detects an angle at which the electronic device 100 jitters, calculates, based on the angle, a distance for which a lens module needs to compensate, and allows a lens to cancel the jitter of the electronic device 100 through reverse motion, to implement image stabilization. The gyro sensor 180B may be further configured for navigation and a motion sensing game scene.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D may include a Hall sensor. The electronic device 100 may detect opening and closing of a flip leather cover by using the magnetic sensor 180D. In some embodiments, when the electronic device 100 is a clamshell phone, the electronic device 100 may detect opening and closing of a flip cover by using the magnetic sensor 180D. Further, features such as automatic unlocking of the flip cover are set based on the detected opening and closing states of the leather case or opening and closing states of the flip cover.

The acceleration sensor 180E may detect magnitudes of acceleration in various directions (usually on three axes) of the electronic device 100, and may detect a magnitude and a direction of gravity when the electronic device 100 is still. The acceleration sensor 180E may be further configured to recognize a posture of the electronic device, and is applied to applications such as switching between landscape and portrait modes and a pedometer.

The distance sensor 180F is configured to measure a distance. The electronic device 100 may measure a distance by using infrared light or laser. In some embodiments, in a shooting scenario, the electronic device 100 may measure a distance by using the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 uses the photodiode to detect reflected infrared light from a nearby object. When sufficient reflected light is detected, it may be determined that an object exists near the electronic device 100. When insufficient reflected light is detected, the electronic device 100 may determine that no object exists near the electronic device 100. The electronic device 100 may detect, by using the optical proximity sensor 180G, that the user holds the electronic device 100 close to an ear for a call, to implement automatic screen-off to save power. The optical proximity sensor 180G may be further configured to automatically unlock and lock the screen in a leather cover mode and a pocket mode.

The ambient light sensor 180L is configured to perceive ambient light brightness. The electronic device 100 may adaptively adjust a brightness of the display 194 based on the perceived ambient light brightness. The ambient light sensor 180L may be further configured to automatically adjust white balance during photo shooting. The ambient light sensor 180L may further cooperate with the optical proximity sensor 180G to detect whether the electronic device 100 is in a pocket, to prevent a false touch.

The fingerprint sensor 180H is configured to collect a fingerprint. The electronic device 100 may implement fingerprint unlocking, application lock accessing, fingerprint photo shooting, fingerprint-based call answering, and the like by using a feature of the collected fingerprint.

The temperature sensor 180J is configured to detect a temperature. In some embodiments, the electronic device 100 executes a temperature treatment strategy based on the temperature detected by the temperature sensor 180J. For example, when a temperature reported by the temperature sensor 180J exceeds a threshold, the electronic device 100 performs performance degradation on a processor located near the temperature sensor 180J, to reduce power consumption and implement thermal protection. In some other embodiments, when the temperature is lower than another threshold, the electronic device 100 heats the battery 142, to avoid an abnormal shutdown of the electronic device 100 caused by a low temperature. In some other embodiments, when the temperature is lower than still another threshold, the electronic device 100 boosts an output voltage of the battery 142, to avoid an abnormal shutdown caused by the low temperature.

The touch sensor 180K is also referred to as a "touch panel". The touch sensor 180K may be disposed on the display 194. The touch sensor 180K and the display 194 form a touchscreen, which is also referred to as a "touchscreen". The touch sensor 180K is configured to detect a touching operation performed on or near the touch sensor 180K. The touch sensor may transfer a detected touching operation to the application processor, to determine a touch event type, and may provide, by using the display 194, visual output related to the touching operation. In some other embodiments, the touch sensor 180K may alternatively be disposed on a surface of the electronic device 100, at a location different from a location of the display 194.

The bone conduction sensor 180M may obtain a vibration signal. In some embodiments, the bone conduction sensor 180M may obtain a vibration signal of a vocal bone of a human body. The bone conduction sensor 180M may alternatively contact a human pulse to receive a blood pressure beating signal. In some embodiments, the bone conduction sensor 180M may alternatively be disposed in a headset to be combined into a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, or the like. The button 190 may be a mechanical button, or may be a touch button. The electronic device 100 may receive a button input and generate a button signal input related to user settings and function control of the electronic device 100.

The motor 191 may generate a vibration prompt. The motor 191 may be configured to provide a vibration prompt for an incoming call, and may be further configured to provide vibration feedback for a touch. For example, touching operations performed on different applications (for example, photo shooting and audio playing) may correspond to different vibration feedback effects. The motor 191 may also correspond to different vibration feedback effects for touching operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power level change, or may be configured to indicate a message, a missed call, a notification, and the like.

The SIM card interface 195 is configured to connect to a SIM card. The SIM card may be inserted into the SIM card interface 195 or removed from the SIM card interface 195 to implement contact with and separation from the electronic device 100. The electronic device 100 may support 1 or N SIM card interfaces, where N is a positive integer greater than 1. The SIM card interface 195 may support a Nano-SIM card, a Micro-SIM card, a SIM card, and the like. A plurality of cards may be inserted into a same SIM card interface 195 simultaneously. The plurality of cards may be of a same type or different types. The SIM card interface 195 may be compatible with different types of SIM cards. The SIM card interface 195 may be further compatible with an external memory card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a microservice architecture, or a cloud architecture. In this embodiment of this application, the software structure of the electronic device 100 is described by using an Android system with a layered architecture as an example.

Figure 3:
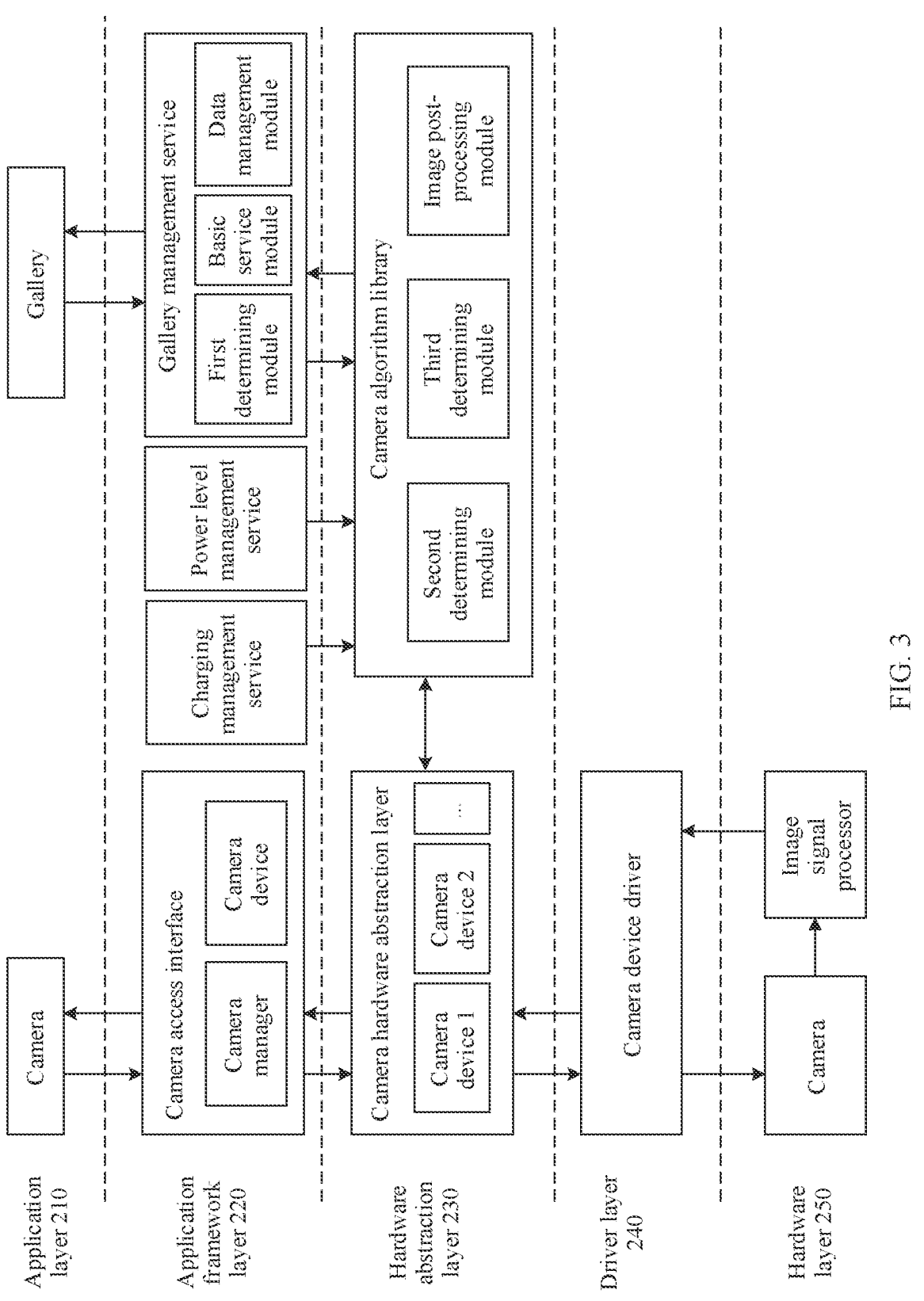
FIG. 3 is a block diagram of a software structure of an electronic device 100 according to an embodiment of this application.

As shown in FIG. 3, the software system using the layered architecture is divided into several layers, and each layer has a clear role and task. Layers communicate with each other through a software interface. In some embodiments, the software system may be divided into five layers that are respectively an application layer 210, an application framework layer 220, a hardware abstraction layer 230, a driver layer 240, and a hardware layer 250 from top to bottom.

The application layer 210 may include a camera app and a gallery app, and may further include apps (not shown in the figure) such as Calendar, Phone, Map, Navigation, WLAN, Bluetooth, Music, Video, and Messages.

The application framework layer 220 provides an application access interface and a programming framework for applications at the application layer 210.

For example, the application framework layer 220 includes a camera access interface. The camera access interface is configured to provide a shooting service of a camera through a camera manager and a camera device.

The camera manager at the application framework layer 220 is configured to manage the camera. The camera manager can obtain a parameter of the camera, for example, to determine a working state of the camera.

The camera device at the application framework layer 220 is configured to provide a data access interface between different camera devices and the camera manager.

In addition, the application framework layer may further include a charging management service, a power level management service, and a gallery management service.

The charging management service serves as a service module of the charging management module, and may manage and serve a charging process of the electronic device. In a specific embodiment, the charging management service may provide charging related information to another module in the software architecture, for example, information about whether the electronic device starts charging.

The power level management service is configured to monitor and manage a power level of the electronic device. In an embodiment, the power level management service may monitor the power level of the electronic device through a battery meter.

The gallery management service serves as a service module of a gallery app, and is configured to receive invoking from the gallery app, to implement processing including managing, viewing, moving, copying, editing, deleting, and the like on an image saved in the electronic device. In an embodiment of this application, the gallery management service may include a first determining module, a basic service module, a data management module, and the like. The first determining module is configured to determine, based on a type of the image and a type of an operation on the image, whether to invoke the image post-processing module to perform image post-processing on the image. The basic service module is configured to perform processing such as managing, viewing, moving, copying, editing, and deleting on an image in response to an operation performed by a user. The data management module is configured to record and manage historical image data and determine through analyzing, based on the historical image data, user habit information. The user habit information is used to represent whether the user is accustomed to viewing an obtained image within preset duration after photo shooting is completed. The historical image data may include data such as a shooting time of a historical image and a time at which a historical image is initially viewed. The historical image is an image obtained before a current moment.

The hardware abstraction layer 230 is configured for abstraction of hardware. For example, the hardware abstraction layer 230 may include a camera hardware abstraction layer and a hardware device abstraction layer of another device (not shown in the figure). The camera hardware abstraction layer may include a camera device 1, a camera device 2, and the like. The camera hardware abstraction layer may be connected to a camera algorithm library, and the camera hardware abstraction layer may invoke an algorithm in the camera algorithm library.

Optionally, in an embodiment of this application, the camera algorithm library may include a second determining module, a third determining module, and the image post-processing module. The second determining module is configured to determine, based on a power level provided by the power level management service, or based on a power level provided by the power level management service and user habit information provided by the gallery management service, whether to invoke the image post-processing module to perform image post-processing on an initial image. The third determining module is configured to determine, based on at least one of charging related information provided by the charging management service and a power level provided by the power level management service, whether to invoke the image post-processing module to perform image post-processing on an initial image.

The image post-processing module is configured to receive invoking from the first determining module, the second determining module, or the third determining module, and perform image post-processing on an initial image. Image post-processing may include image enhancement processing, image scaling processing, and the like. Image enhancement processing includes but is not limited to performing noise reduction processing, saturation processing, and the like on an image. It should be noted that image post-processing may include default processing on an initial image, and may further include processing on the initial image based on a photo shooting mode selected by the user. Specific content of image post-processing is not limited in this embodiment of this application.

It should be noted that the first determining module, the second determining module, and the third determining module all determine whether to perform image post-processing. However, the second determining module performs determining in a photo shooting phase. In this case, an initial image may be saved in a buffer but not in a memory. The first determining module and the third determining module perform determining after the initial image is saved in the memory, to determine whether to start image post-processing on the initial image saved in the memory.

The driver layer 240 is configured to provide drivers for different hardware devices. For example, the driver layer may include a camera device driver.

The hardware layer 250 may include a camera, an image signal processor, and another hardware device.

The following describes an example of a working process of the software system of the electronic device 100 with reference to a photo shooting scenario.

When the touch sensor 180K receives a touching operation performed by the user, for example, the touching operation is a tapping operation and a control corresponding to the tapping operation is a photo shooting control in the camera app, the camera app is awakened by the tapping operation. The camera app invokes each camera device of the camera hardware abstraction layer through the camera access interface of the application framework layer. For example, after determining a current zoom ratio, the camera hardware abstraction layer may deliver, to the camera device driver, an instruction for invoking the camera.

After the camera at the hardware layer is invoked, the camera obtains an original image, and sends the original image to the image signal processor for preliminary processing such as registration and decoding, to generate an initial image. The image signal processor returns processed initial image data to the hardware abstraction layer through the camera device driver. In this case, the second determining module in the camera algorithm library determines, based on at least one of a power level provided by the power level management service and user habit information provided by the gallery management service, whether to invoke the image post-processing module to perform image post-processing on the initial image.

Specifically, if at least one of the power level and the user habit information meets a corresponding preset condition, the second determining module invokes the image post-processing module to perform image post-processing on the initial image to obtain a finished image. The image post-processing module sends an obtained finished image to the camera app for storage through the camera hardware abstraction layer and the camera access interface. The camera app stores the finished image in a preset storage location, for example, an album (hereinafter referred to as a first preset album) at a preset storage path.

If neither the power level nor the user habit information meets a corresponding preset condition, the initial image is sent back to the camera app through the camera hardware abstraction layer and the camera access interface. The camera app stores the initial image in a second preset album, and the second preset album may be the same as or different from the first preset album.

The following describes an example of a working process of the software system of the electronic device 100 with reference to an image viewing scenario.

When the touch sensor 180K receives a touching operation of a user, for example, the touching operation is a tapping operation, and the tapping operation is performed on a thumbnail of a specific image on an interface of the gallery app, in response to the tapping operation performed by the user on the thumbnail, the gallery app determines, through the first determining module in the gallery management service of the application framework layer, whether an image corresponding to the thumbnail is an initial image. If the image corresponding to the thumbnail is an initial image, the first determining module invokes the image post-processing module in the camera algorithm library of the hardware abstraction layer to perform image post-processing on the initial image to obtain a finished image. The image post-processing module returns the finished image to the basic service module in the gallery management service, and the basic service module displays the finished image, and saves an obtained finished image in the first preset album. If the image corresponding to the thumbnail is a finished image, the basic service module directly displays the finished image.

In addition, the third determining module may determine, based on at least one of charging related information provided by the charging management service and a power level provided by the power level management service, whether to invoke the image post-processing module to perform image post-processing on the initial image saved in the second preset album. Specifically, if at least one of the charging related information and the power level meets the corresponding preset condition, the third determining module invokes the image post-processing module to perform image post-processing on the initial image saved in the second preset album to generate a finished image, and saves the finished image in the first preset album.

Optionally, the third determining module may periodically obtain charging related information and a power level from the charging management service and the power level management service, and determine whether to invoke the image post-processing module to perform image post-processing on a saved initial image. Optionally, the third determining module may alternatively subscribe to the charging management service and the power level management service for charging related information and a power level, and the charging management service and the power level management service actively send a changed status and changed information to the third determining module when a charging status changes, or when a power level status, a power level mode, or the like changes. This is not limited in this embodiment of this application.

For ease of understanding, in the following embodiments of this application, an electronic device having the structures shown in FIG. 2 and FIG. 3 is used as an example, and an image processing method provided in embodiments of this application is specifically described with reference to the accompanying drawings and an application scenario.

Embodiment 1

Figure 4:
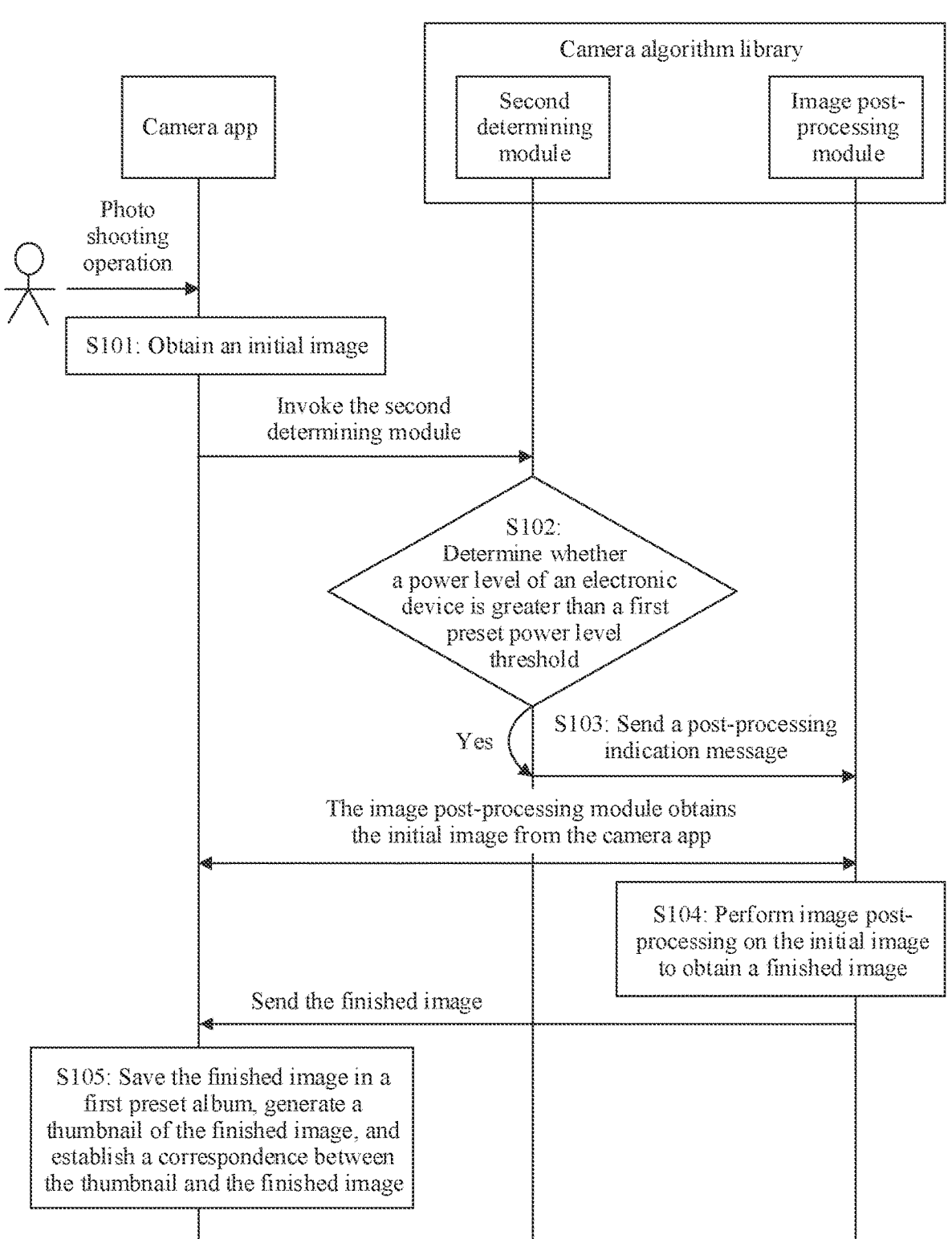
FIG. 4 is a schematic flowchart of an image processing method according to an embodiment of this application.
Figure 5:
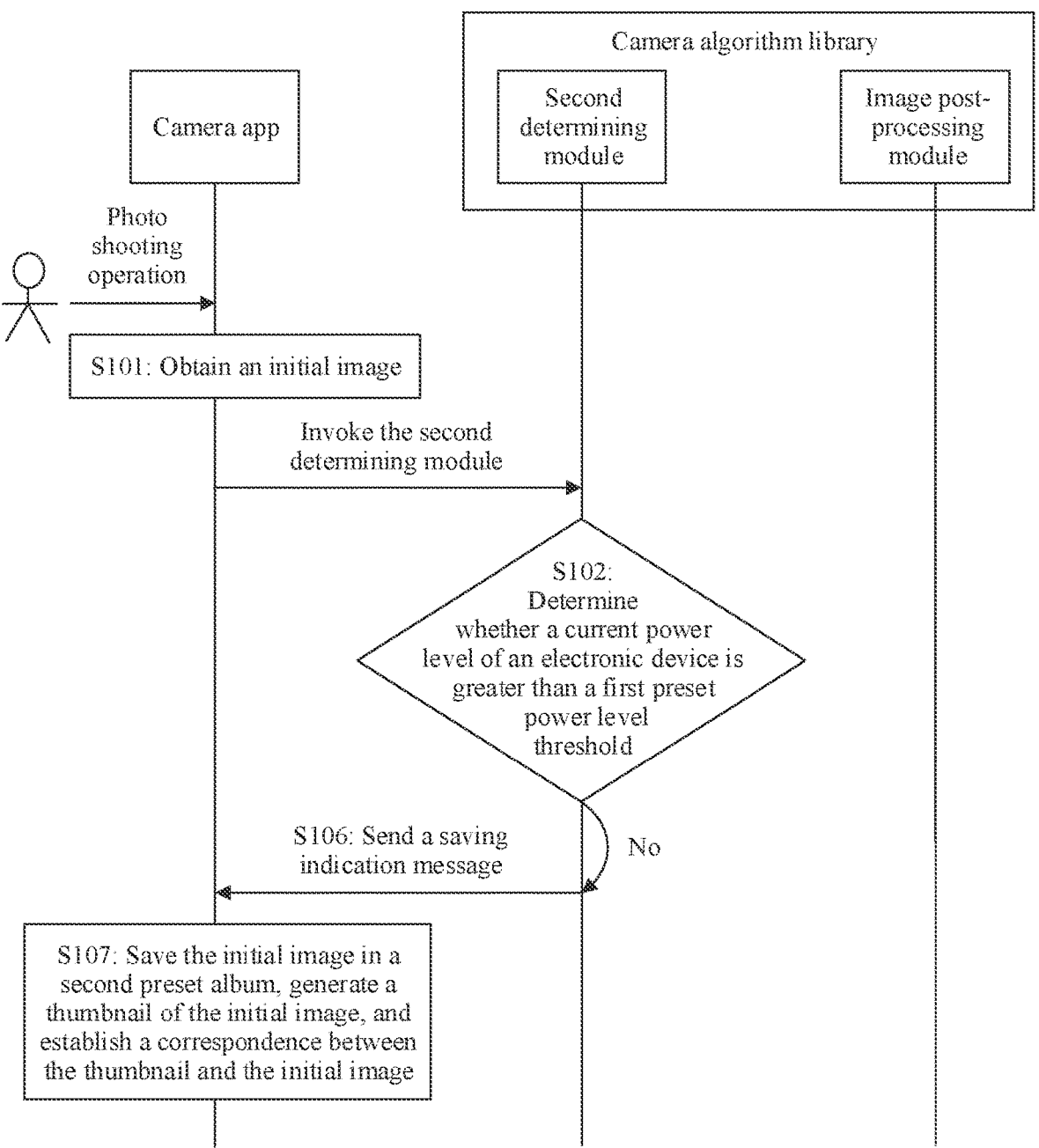
FIG. 5 is another schematic flowchart of an image processing method according to an embodiment of this application.

FIG. 4 and FIG. 5 each are a schematic flowchart of an image processing method according to an embodiment of this application. As shown in FIG. 4 and FIG. 5, the method includes the following steps.

S101: In response to a photo shooting operation performed by the user, a camera app obtains an initial image, and invokes a second determining module in a camera algorithm library.

Optionally, the photo shooting operation performed by the user may be, for example, tapping on a photo shooting control in a camera app preview interface by the user in the foregoing embodiment, or voice inputting a photo shooting instruction by the user, or inputting a preset gesture by the user, or capturing a preset expression of the user. A specific form of the photo shooting operation is not limited in this embodiment of this application. When the camera app detects the photo shooting operation performed by the user, the camera APP finally invokes, through a camera access interface, camera devices of a camera hardware abstraction layer and a camera device driver, a camera to shoot a photo, and performs, through an image signal processor, preliminary processing such as registration and decoding to obtain an initial image. For details, refer to the foregoing embodiment. Details are not described herein again. For ease of description, in this embodiment, an execution body of the foregoing photo shooting process is summarized as the camera app.

Optionally, the initial image may be in a raw format.

It may be understood that each initial image may have a unique name or number, or the like to be distinguished from another initial image. In a specific embodiment, initial images may be distinguished by names, and each initial image may be named based on a shooting time and a format of the image. For example, a name of the initial image may be IMG_20220801_080119.raw.

S102: In response to invoking from the camera app, the second determining module in the camera algorithm library determines whether a power level of an electronic device is greater than a first preset power level threshold, and if yes, performs step S103 (refer to FIG. 4), or if no, performs step S106 (refer to FIG. 5).

Specifically, the second determining module may obtain the power level of the electronic device from the power level management service, and compare the power level of the electronic device with the first preset power level threshold.

Optionally, the first preset power level threshold may be, for example, 20% of a total battery capacity of the electronic device.

S103: The second determining module sends a post-processing indication message to the image post-processing module, where the post-processing indication message is used to indicate to perform image post-processing on the initial image.

Optionally, the post-processing indication message may carry information such as a name of a to-be-processed initial image.

S104: In response to the post-processing indication message, the image post-processing module obtains the initial image from the camera app, performs image post-processing on the initial image to obtain a finished image, and sends the finished image to the camera app.

In other words, when the power level of the electronic device is greater than the first preset power level threshold, post-processing is directly performed on the initial image, to obtain the finished image.

Optionally, the finished image may be in a .jpg format, a .png format, or the like.

It may be understood that each finished image may have a unique name or number, or the like to be distinguished from another finished image. In a specific embodiment, finished images may be distinguished by names, and each finished image may be named based on a shooting time of an initial image corresponding to the finished image and a format of the finished image. For example, a name of the finished image may be IMG_20220801_080119.jpg. IMG_20220801_080119.png, or the like.

S105: The camera app saves the finished image in a first preset album, generates a thumbnail of the finished image, and establishes a correspondence between the thumbnail and the finished image.

Specifically, the finished image obtained through image post-processing may be saved in the first preset album based on a first preset storage path. Optionally, the thumbnail of the finished image may be generated based on the finished image or the initial image corresponding to the finished image, and includes a part or all of content of the finished image or the initial image. Specific content, a generation manner, and the like of the thumbnail of the finished image are not limited in this embodiment of this application. After the thumbnail is generated, when the user opens an interface of the first preset album through a gallery app, the interface displays thumbnails of a preset quantity of images.

It may be understood that each thumbnail may have a unique name or number, or the like. Optionally, a name or a number of a thumbnail may be used to establish a correspondence with a name or a number of a finished image. For example, a name of a thumbnail is A, and a name of a finished image is IMG_20220805_110707.jpg. A correspondence between A and IMG_20220805_110707.jpg is established, so that a correspondence between the thumbnail and the finished image is established.

S106: The second determining module sends a saving indication message to the camera app, where the saving indication message is used to indicate to save the initial image.

Specifically, the saving indication message may carry information such as the name of the initial image.

S107: The camera app saves the initial image in a second preset album, generates a thumbnail of the initial image, and establishes a correspondence between the thumbnail and the initial image.

As described above, the second preset album may be the same as or different from the first preset album.

In other words, when the power level of the electronic device is less than or equal to the first preset power level threshold, post-processing is not performed on the initial image, but the initial image is directly saved in the second preset album, and the thumbnail of the initial image is generated and the correspondence between the thumbnail and the initial image is established. Optionally, the thumbnail of the initial image may be generated based on the initial image, and includes a part or all of content of the initial image.

Optionally, a name or a number of a thumbnail may be used to establish a correspondence with a name or a number of an initial image. For example, a name of a thumbnail is B, and a name of a finished image is IMG_20220805_110707.raw. A correspondence between B and IMG_20220805_110707.raw is established, so that a correspondence between the thumbnail and the initial image is established.

The following describes user interfaces of the foregoing process with reference to the accompanying drawings.

Figures 6A, 6B:
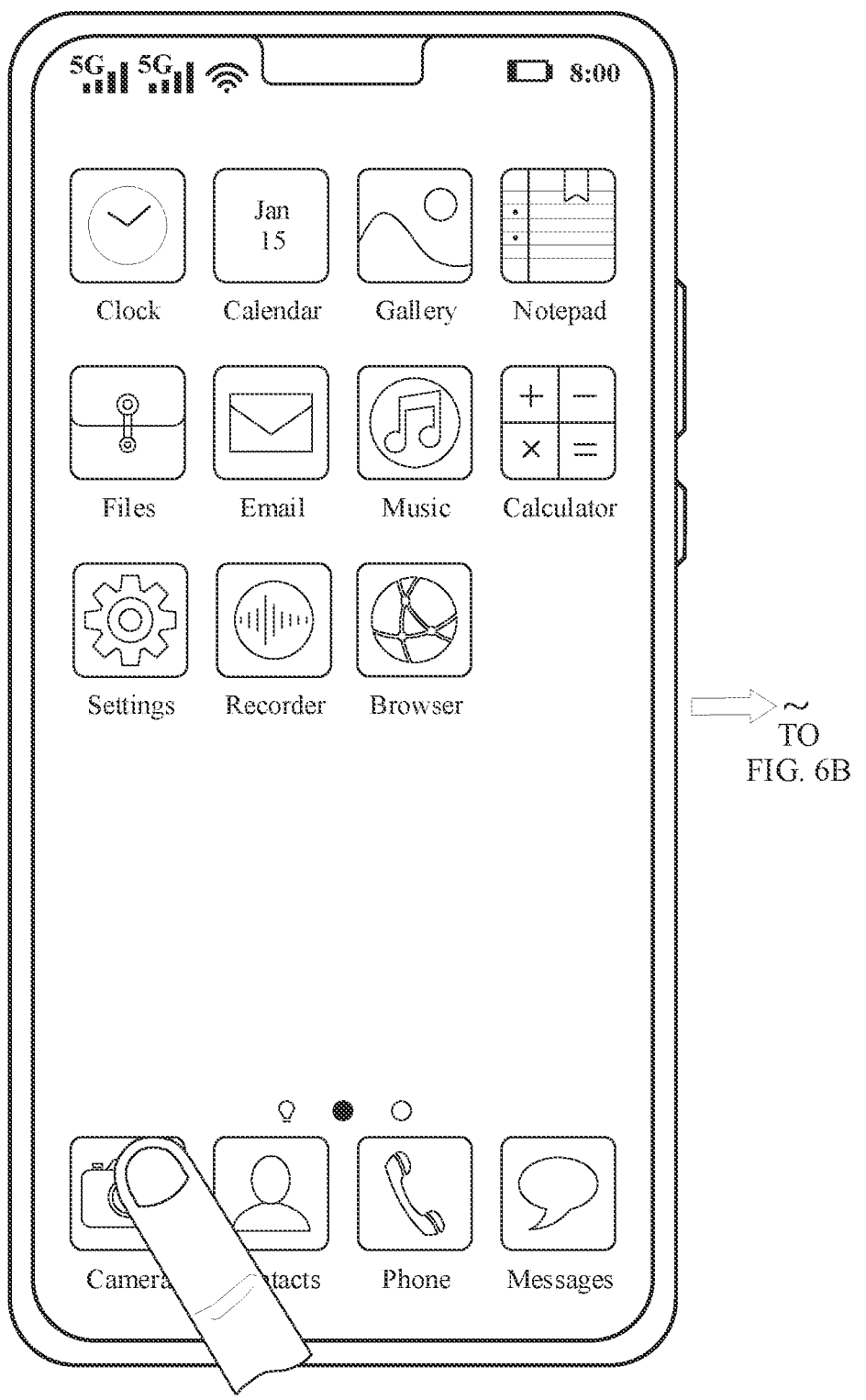
FIG. 6A to FIG. 6D are schematic diagrams of interface changes in a photo shooting process according to an embodiment of this application.
Figures 6A, 6B, 6C:
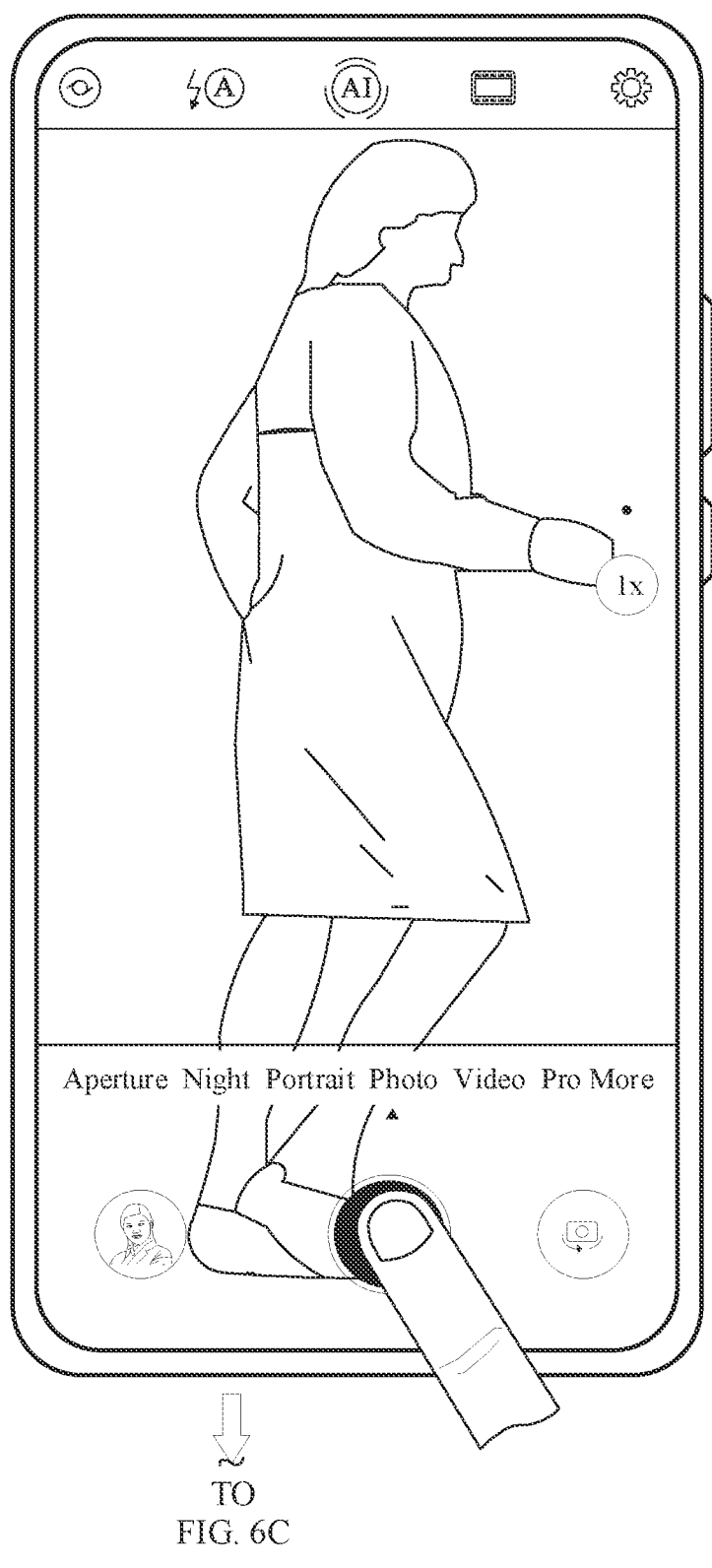
Figures 6B, 6C:
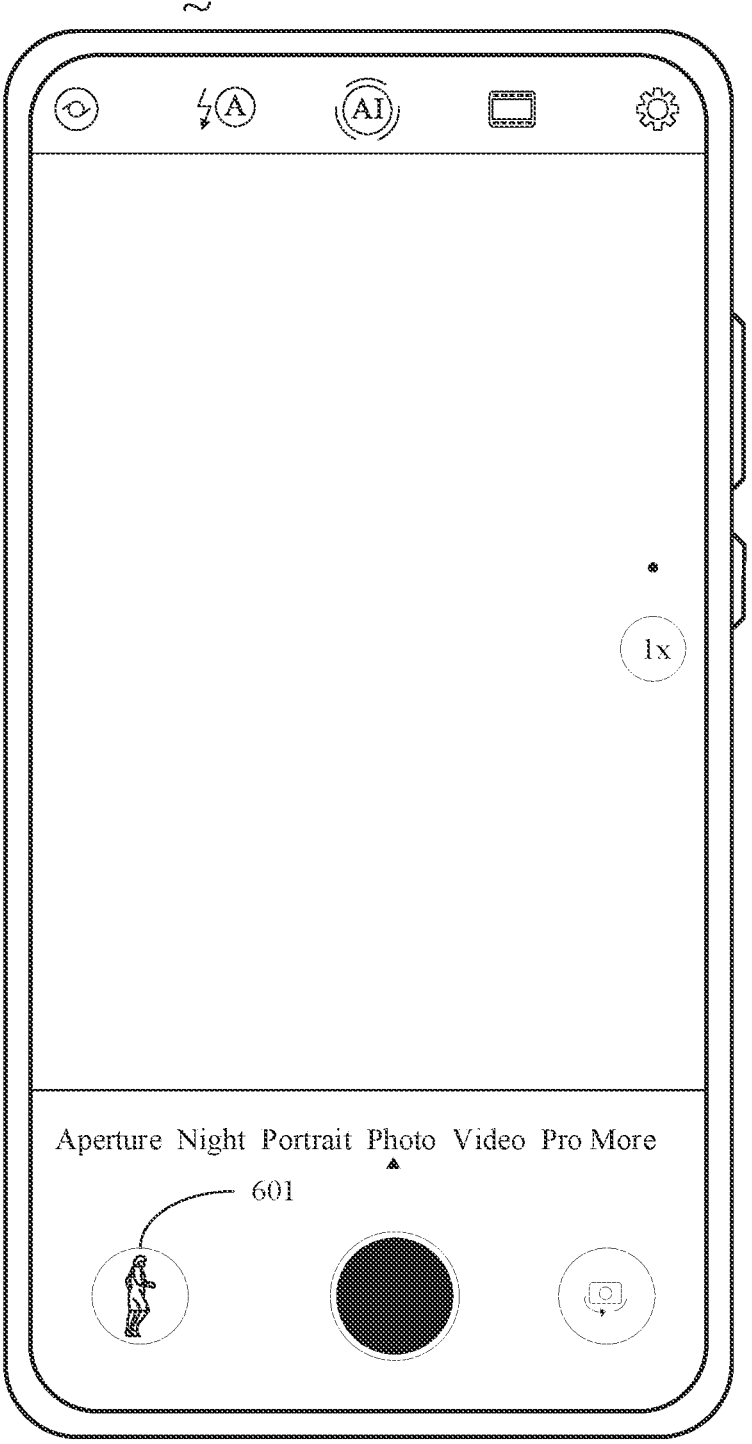
Figure 6D:
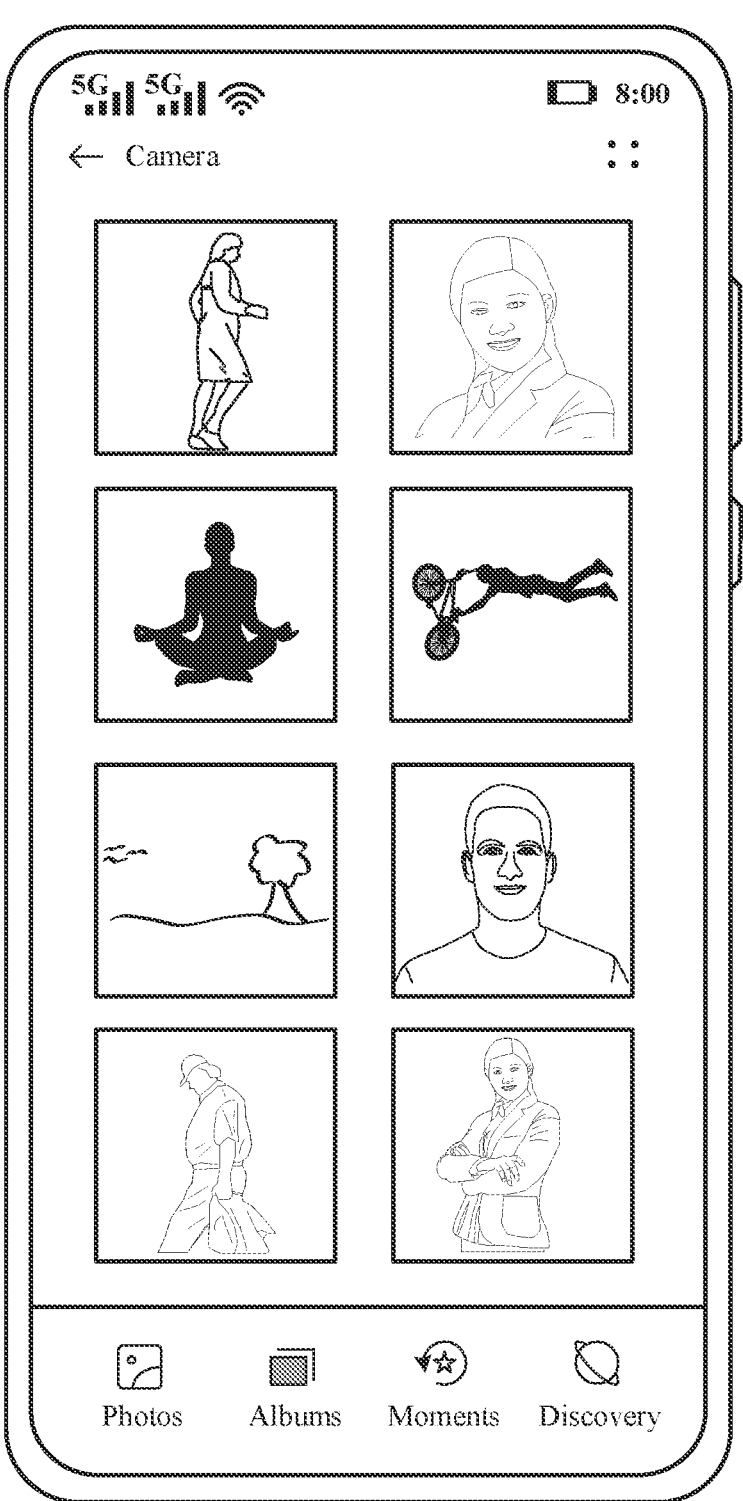

For example, FIG. 6A to FIG. 6D are schematic diagrams of interface changes in a photo shooting process according to an embodiment of this application. For example, an electronic device is a mobile phone. As shown in FIG. 6A, a user taps a camera icon on a home screen. In response to an operation performed by the user, the electronic device opens a camera app to display a preview interface, as shown in FIG. 6B. When the user taps a photo shooting control in the preview interface, the electronic device shoots a photo by using a camera. When a power level of the electronic device is greater than a first preset power level threshold, the electronic device generates a finished image and saves the finished image in a first preset album, and when a power level of the electronic device is less than or equal to a first preset power level threshold, the electronic device saves an initial image in a second preset album. A thumbnail corresponding to an image is generated regardless of a power level condition. In a specific embodiment, a thumbnail corresponding to a latest image is shown as 601 in FIG. 6C. In addition, for example, the first preset album is the same as the second preset album. If the user opens the album by using a gallery app, thumbnails corresponding to a finished image and an initial image are also displayed on an interface of the album, as shown in FIG. 6D.

In this embodiment, when the power level of the electronic device is less than or equal to the first preset power level threshold, the initial image obtained through shooting is not processed, and the initial image is directly saved in the second preset album. In this way, image post-processing is not performed, so that power consumption can be reduced, battery life of the electronic device can be prolonged, and user experience can be improved.

For the initial image saved in the second preset album when the power level of the electronic device is less than or equal to the first preset power level threshold in the foregoing process, the electronic device may start image post-processing on the initial image in the following several cases.

(1) It is detected that the user performs an operation of a preset type such as viewing, sharing, moving, copying, and editing on an initial image.

When the electronic device detects that the user performs the operation of a preset type such as viewing, sharing, copying, and editing on the initial image, the electronic device starts post-processing on the initial image. The following provides descriptions with reference to the accompanying drawings.

Figure 7:
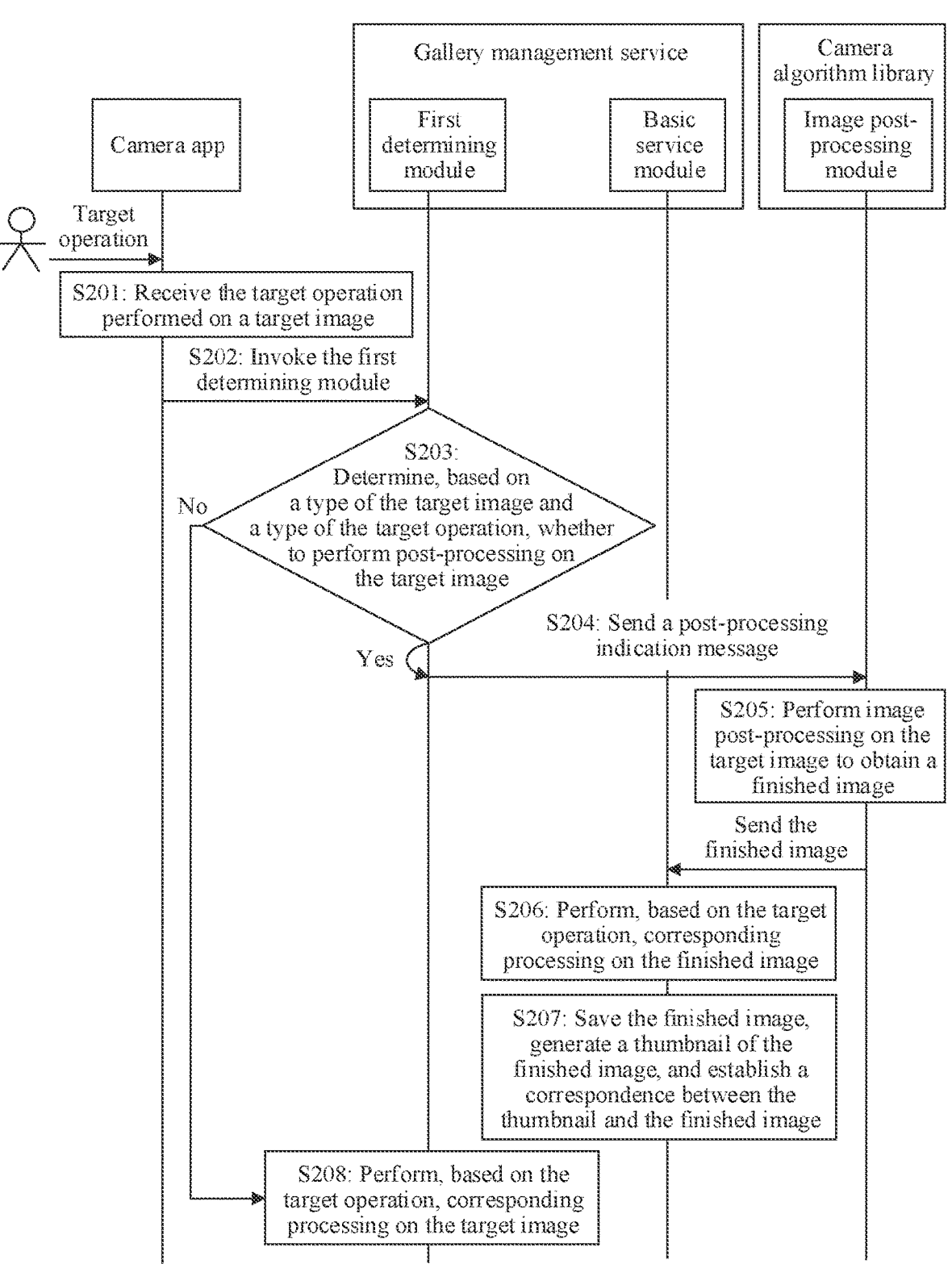
FIG. 7 is still another schematic flowchart of an image processing method according to an embodiment of this application.

For example. FIG. 7 is another schematic flowchart of an image processing method according to an embodiment of this application. As shown in FIG. 7, the method includes the following steps.

S201: A gallery app receives a target operation performed by the user on a target image.

The target image is an image selected by the user. The target operation is an operation performed by the user. Optionally, the user may perform the target operation on the target image in the gallery app, or may perform the target operation on the target image in a third-party app (for example, WeChat®).

The following explains operations of preset types:

A viewing operation is used to indicate to open and display an image. Optionally, the viewing operation may be an operation of tapping a thumbnail. The thumbnail may be a thumbnail in the camera preview interface, or may be a thumbnail in the interface of the album in the camera app. Optionally, the viewing operation may alternatively be an operation of swiping left or swiping right after opening an image.

A sharing operation is used to indicate to transmit an image to a target device in a transmission manner selected by the user, upload an image to a network, or the like. Transmission manners include, for example, Bluetooth transmission. WLAN direct connection transmission, communication app (such as WeChat® and QQ®) transmission, and the like. Uploading to a network, for example, includes uploading to a cloud disk, saving to QQ Favorites, and the like.

A moving operation is used to indicate to move an image from a current storage location to another storage location. For example, an image is moved from an album A to an album B. It may be understood that the moving operation is essentially a cutting operation.

A copying operation is used to indicate to copy an image and save a copied image to a storage location. For example, an image in an album A is copied, and a copied image is saved in an album B.

An editing operation is used to indicate to perform editing, including but not limited to splicing, compositing, adding content to an image, changing content in an image, and the like, on an image.

It may be understood that the foregoing operations of preset types have a specific requirement for a display effect of an image. Therefore, when the user performs the foregoing operations of the preset types, the electronic device responds to the operation based on a finished image instead of an initial image, so that a display effect of an image is improved and user experience is improved. For example, the user performs the viewing operation, and the electronic device opens and displays a finished image. Compared with opening and displaying an initial image, this improves a display effect of an image and improves user experience.

S202: In response to the target operation, the gallery app invokes a first determining module in a gallery management service.

S203: In response to invoking from the gallery app, the first determining module determines, based on a type of the target image and a type of the target operation, whether to perform post-processing on the target image, and if yes, performs step S204, or if no, performs step S208.

Optionally, types of the target image include an initial image and a finished image. Types of the target operations include viewing, sharing, moving, copying, editing, deleting, and the like.

Optionally, when the gallery app invokes the first determining module, information such as a name of the target image and the type of the target operation may be carried. In the foregoing embodiment, the name of the target image may be named based on a shooting time of the image and a format of the image.

Specifically, the first determining module may determine whether the type of the target operation belongs to one of the foregoing preset types. If the type of the target operation is not one of the foregoing preset types, it is determined that post-processing is not to be performed on the target image. If the type of the target operation belongs to one of the foregoing preset types, the first determining module determines whether the target image is an initial image. If the target image is not an initial image (that is, the target image is a finished image), it is determined that image post-processing is not to be performed on the target image. If the target image is an initial image, it is determined that image post-processing is not to be performed on the target image.

In a possible implementation, the first determining module may determine, based on the name of the target image, whether the target image is an initial image. If an image format in the name of the target image is .raw, it is determined that the target image is an initial image. If the image format in the name of the target image is .jpg, .png, or the like, it is determined that the target image is a finished image.

In another possible implementation, when the first preset album is different from the second preset album, the first determining module and the second determining module may alternatively determine, based on an album in which the target image is located (that is, a storage location), whether the target image is an initial image. If the album in which the target image is located is the first preset album, it is determined that the target image is a finished image. If the album in which the target image is located is the second preset album, it is determined that the target image is an initial image.

Certainly, whether the target image is an initial image may be determined in another manner, for example, based on a preset mark. This is not limited in this embodiment of this application and may be designed based on an actual requirement.

S204: The first determining module sends a post-processing indication message to the image post-processing module in the camera algorithm library, where the post-processing indication message is used to indicate to perform image post-processing on the initial image.

S205: In response to the post-processing indication message, the image post-processing module performs image post-processing on the target image to obtain a finished image, and sends the finished image to a basic service module in the gallery management service.

Optionally, in a process in which the image post-processing module performs image post-processing on the target image, information indicating that the image is being processed may be displayed on an interface of the electronic device, to prompt the user that the image is currently being processed, so that interaction with the user is improved and user experience is further improved. For example, in an image post-processing process, a text of "Processing . . . Please wait" is displayed on the interface, or a processing progress bar is dynamically displayed on the interface. This is not limited in this embodiment of this application.

S206: The basic service module performs, based on the target operation, corresponding processing on the finished image.

Specifically, if the target operation is a viewing operation, the basic service module displays the finished image. If the target operation is a sharing operation, the basic service module sends the finished image to the target device in a transmission manner selected by the user or uploads the finished image to a network. If the target operation is a copying operation, the basic service module copies the finished image, and saves a copied finished image to a target album. If the target operation is a moving operation, the basic service module cuts the finished image from the album, and saves the finished image to a target album. If the target operation is an editing operation, the basic service module performs editing based on the finished image.

S207: The basic service module saves the finished image, generates a thumbnail of the finished image, and establishes a correspondence between the thumbnail and the finished image.

Optionally, the thumbnail of the finished image herein may be the same as or different from the thumbnail of the initial image corresponding to the finished image.

It may be understood that, for an operation in which a saving step is included such as the moving operation and the copying operation, a saving operation may not be repeatedly performed on the finished image.

In this step, after image post-processing is performed on the initial image, the generated finished image is saved, the thumbnail of the finished image is generated, and the correspondence between the thumbnail and the finished image is established. In this way, it is convenient for the user to subsequently use, by using the thumbnail, the finished image, and user experience is improved.

Optionally, after the finished image is saved, the thumbnail of the initial image and the initial image may also be deleted.

S208: The basic service module performs, based on the target operation, corresponding processing on the target image.

Specifically, if the target image is a finished image, corresponding processing is directly performed on the finished image. If the target image is an initial image, but the target operation is not an operation of a preset type, corresponding processing is directly performed on the initial image. For example, if the target image is an initial image, and the target operation is a deleting operation, the initial image is directly deleted.

In this embodiment, when the target image is an initial image, and the operation performed by the user on the target image is an operation of a preset type, that is, when the user has a use requirement for the initial image, the electronic device performs image post-processing on the initial image to generate a finished image, and performs, based on the target operation, corresponding processing in response to the finished image. In this way, a processing effect of the image can be improved, a use requirement of the user can be met, and user experience can be improved.

The following describes display interfaces of an electronic device when an operation of the foregoing preset types is performed with reference to the accompanying drawings.

Figures 8A, 8B:
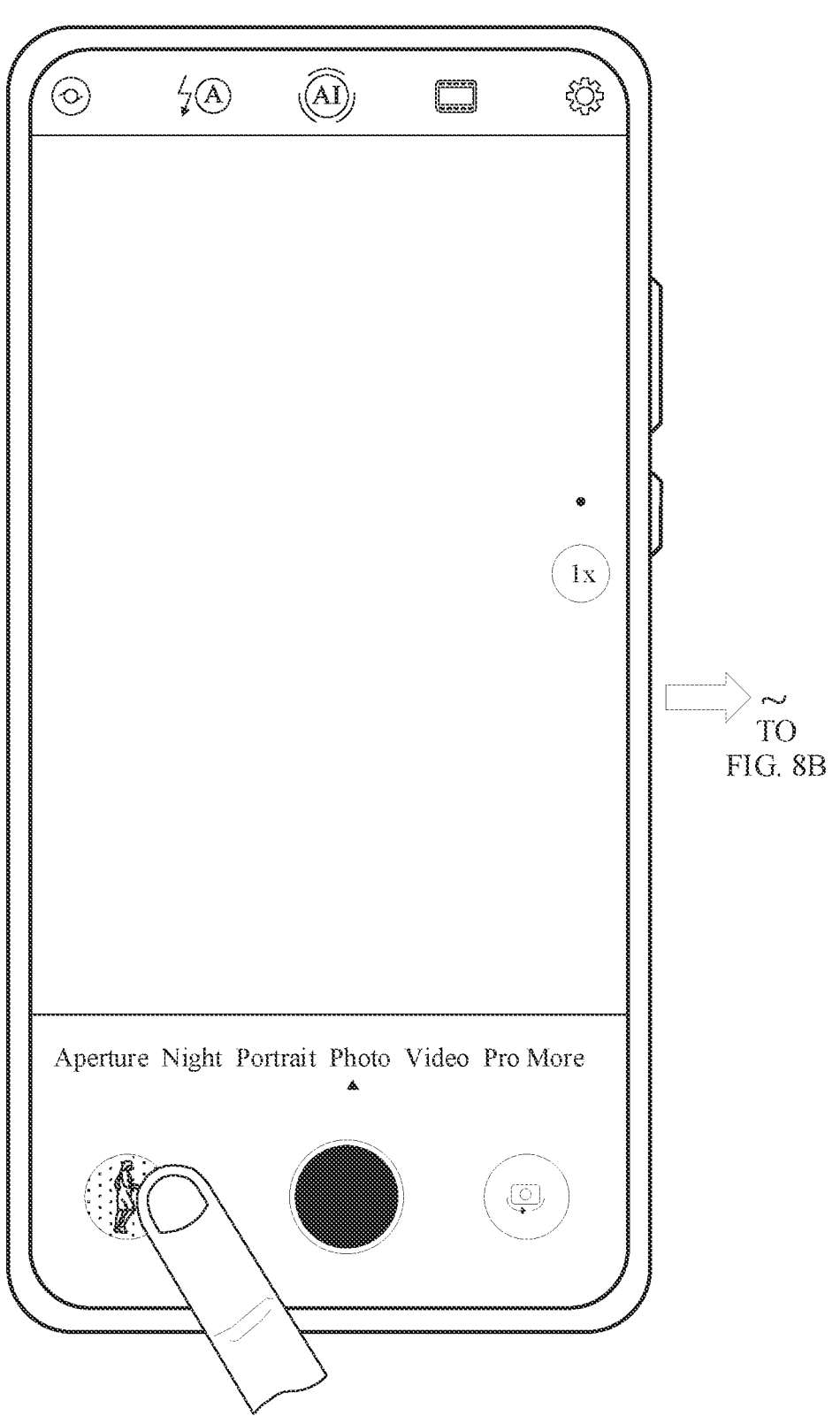
FIG. 8A to FIG. 8D are schematic diagrams of interfaces for performing a viewing operation on an image according to an embodiment of this application.
Figures 8A, 8B, 8C:
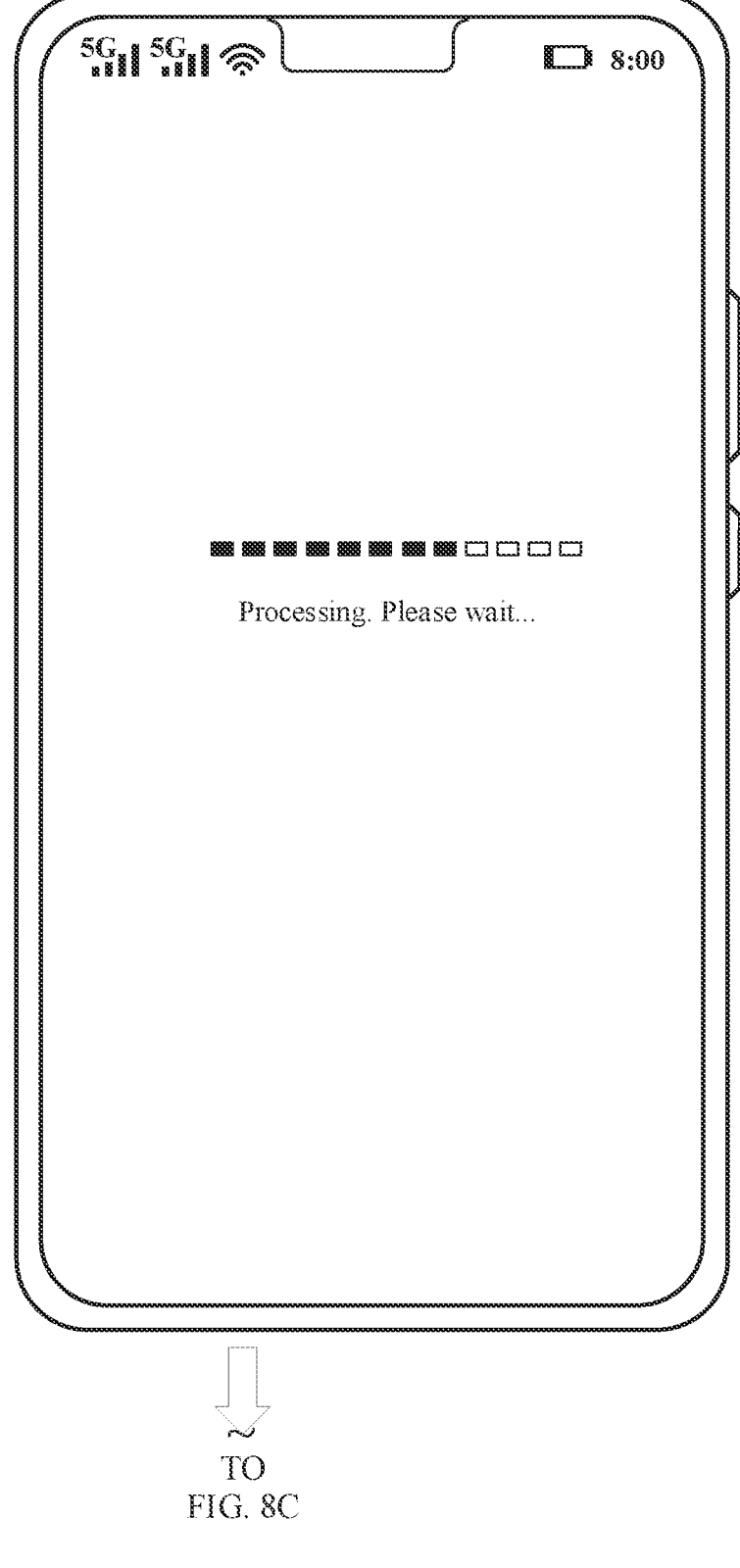
Figures 8B, 8C, 8D:
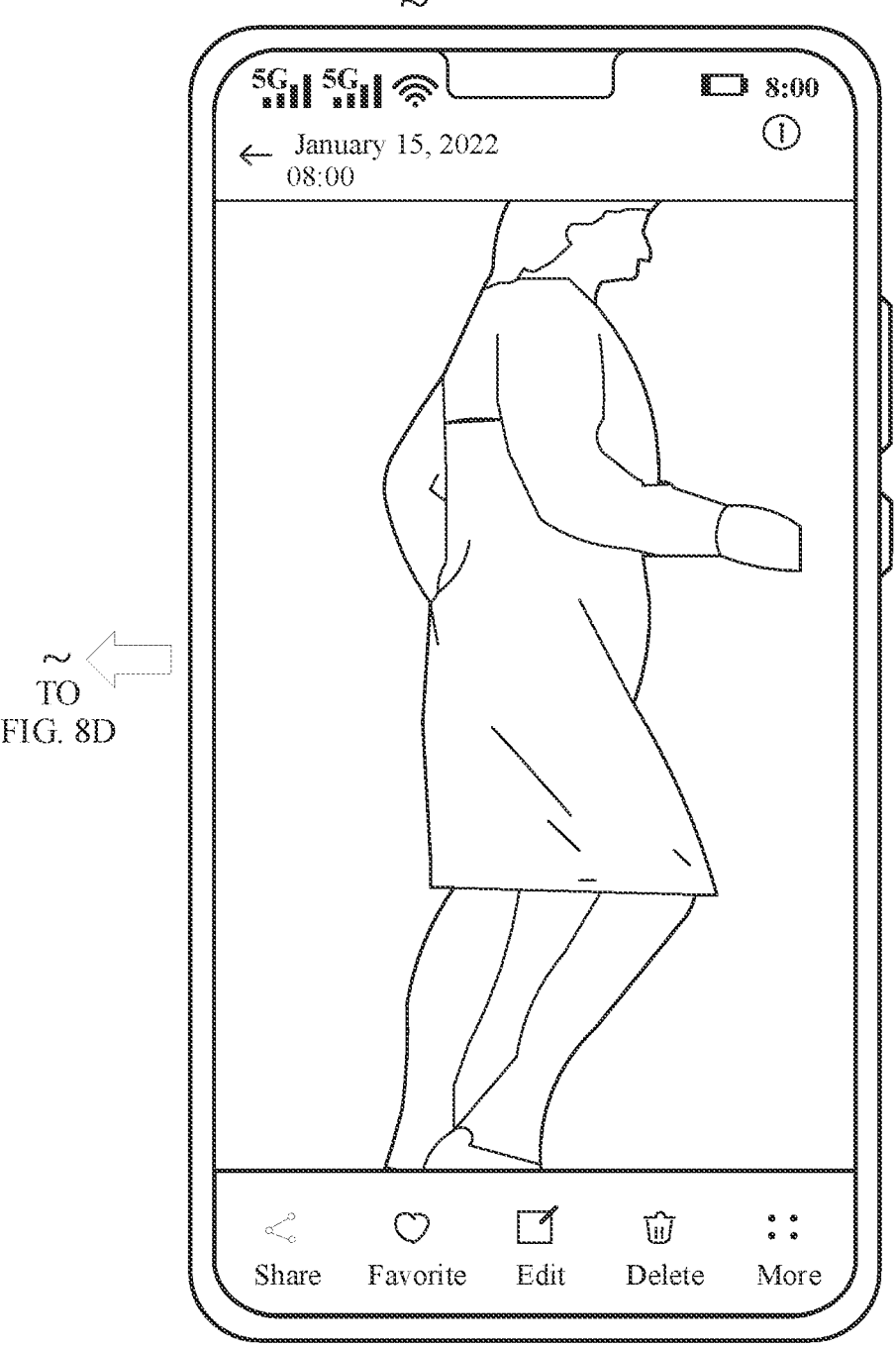
Figures 8C, 8D:
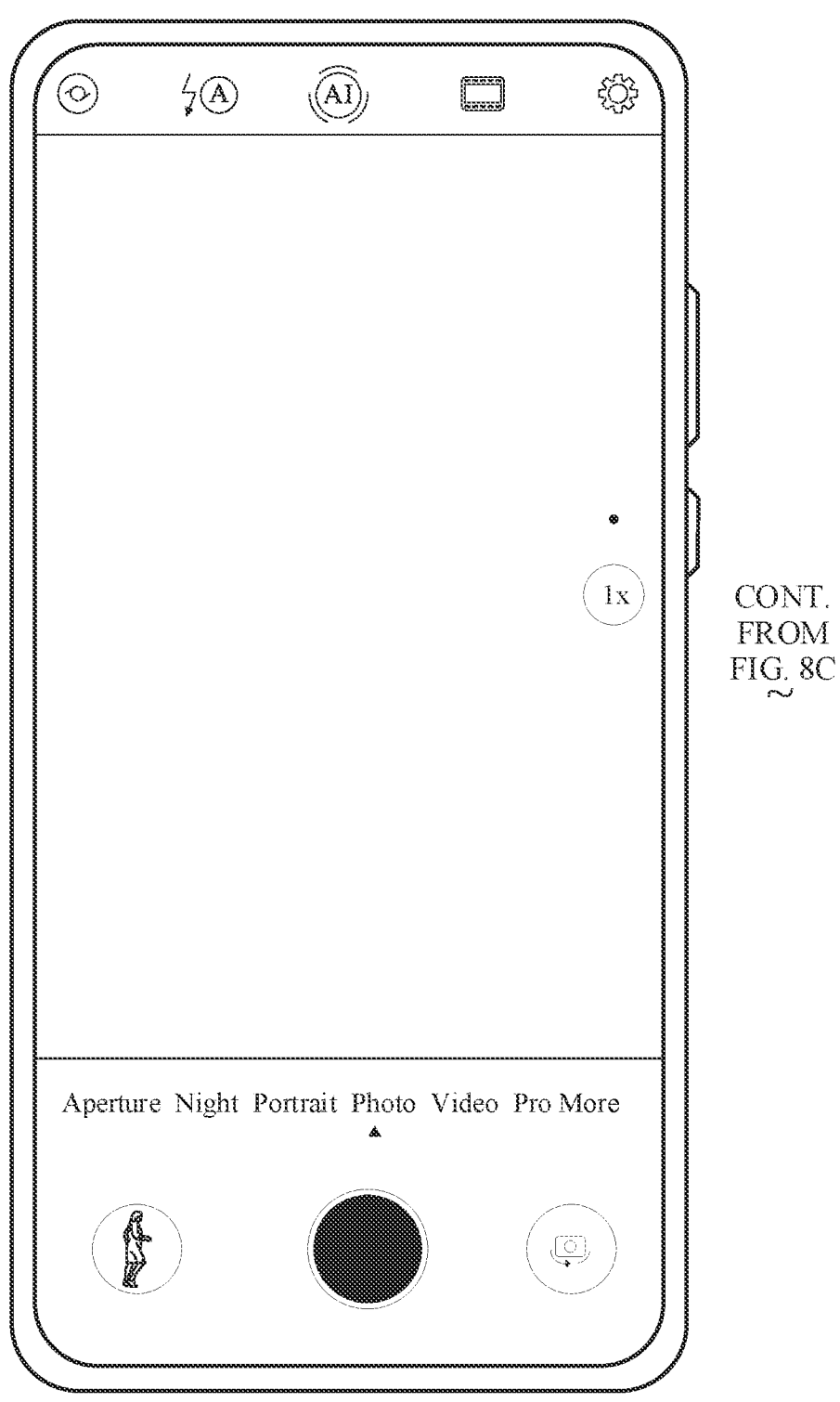

For example, FIG. 8A to FIG. 8D are schematic diagrams of interfaces for performing a viewing operation on an image according to an embodiment of this application. As shown in FIG. 8A, in a camera preview interface, the user clicks a thumbnail, that is, the user performs a viewing operation on an image corresponding to the thumbnail, and the electronic device determines, in response to the operation of the user, whether an image (a target image) corresponding to the thumbnail is an initial image. If the image corresponding to the thumbnail shown in FIG. 8A is an initial image, image post-processing is performed on the initial image. In an image post-processing process, an interface of the electronic device may be shown in FIG. 8B. After image post-processing is completed, a finished image is generated and displayed, as shown in FIG. 8C. In addition, for example, a thumbnail of a finished image is different from a thumbnail of an initial image. The electronic device saves the finished image, replaces the thumbnail of the initial image with a thumbnail of the finished image, and establishes a correspondence between the thumbnail of the finished image and the finished image. After performing the viewing operation, the user returns to the camera preview interface, and the thumbnail in the interface is replaced with the thumbnail corresponding to the finished image, as shown in FIG. 8D. For ease of differentiation, in this embodiment of this application, a thumbnail with pattern filling represents the thumbnail of the initial image, and a thumbnail without pattern filling represents the thumbnail of the finished image.

If the image corresponding to the thumbnail tapped by the user in the camera preview interface is a finished image, the electronic device directly opens and displays the finished image in response to the viewing operation performed by the user, as shown in FIG. 8C.

Figures 9A, 9B:
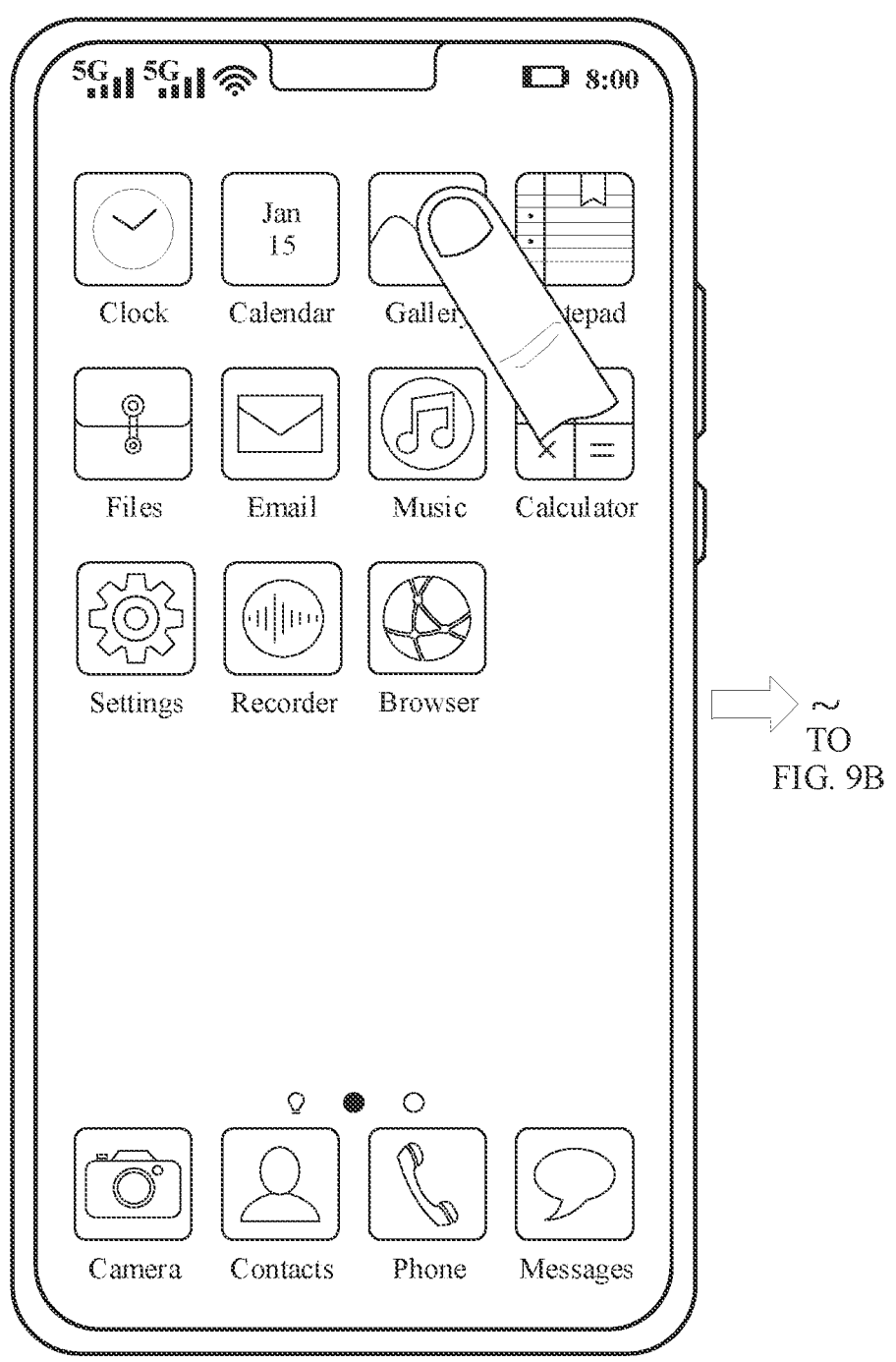
FIG. 9A to FIG. 9F are other schematic diagrams of interfaces for performing a viewing operation on an image according to an embodiment of this application.
Figures 9A, 9B, 9C:
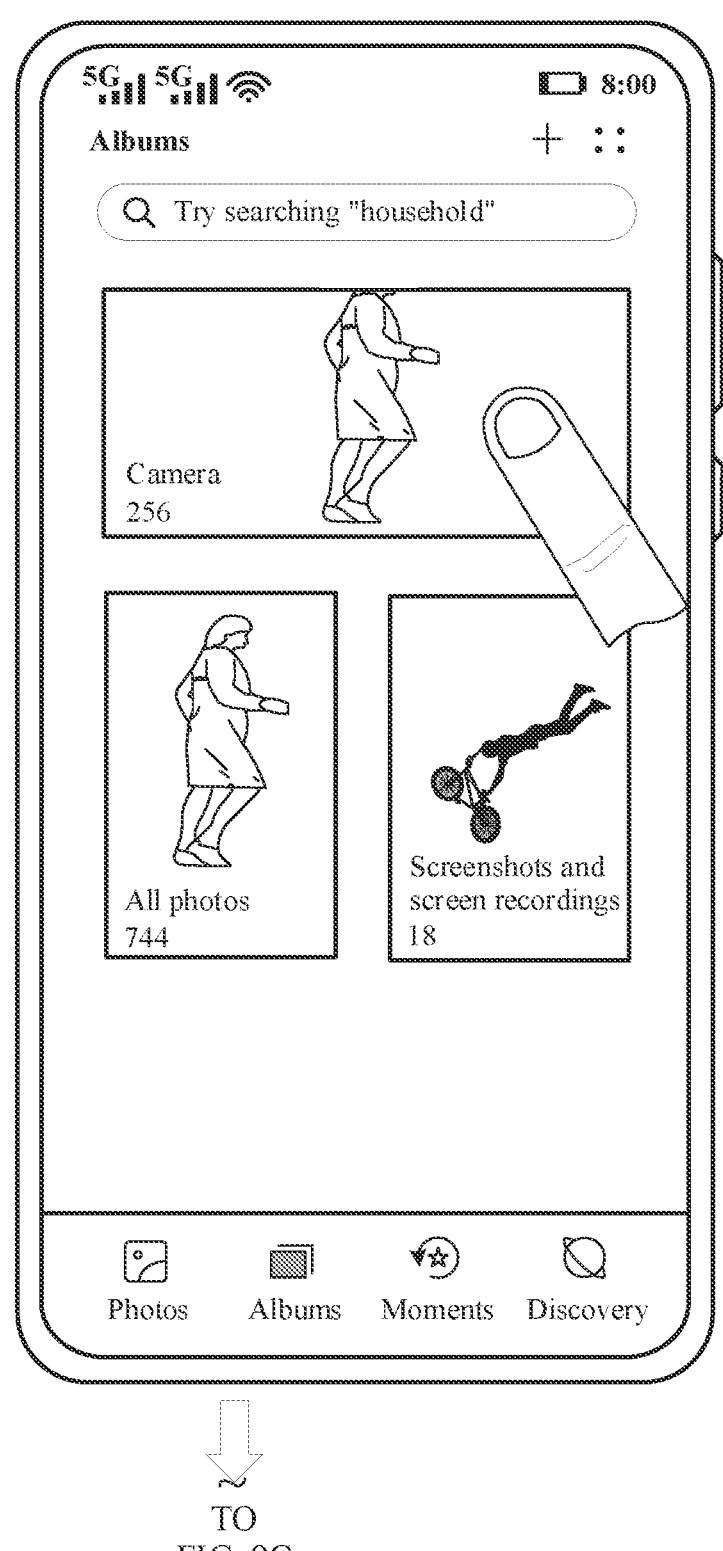
Figure 9C:
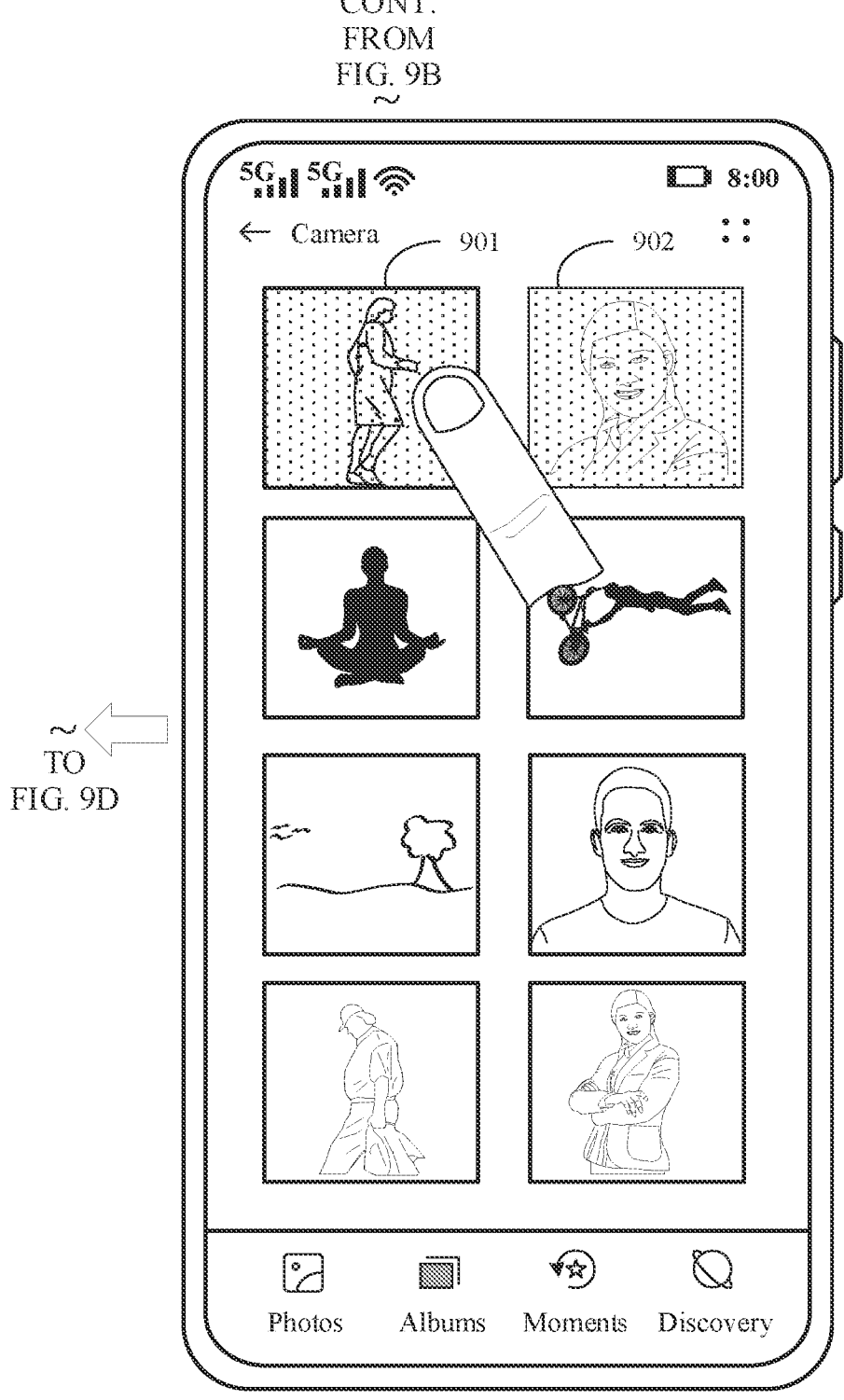
Figures 9C, 9D, 9E:
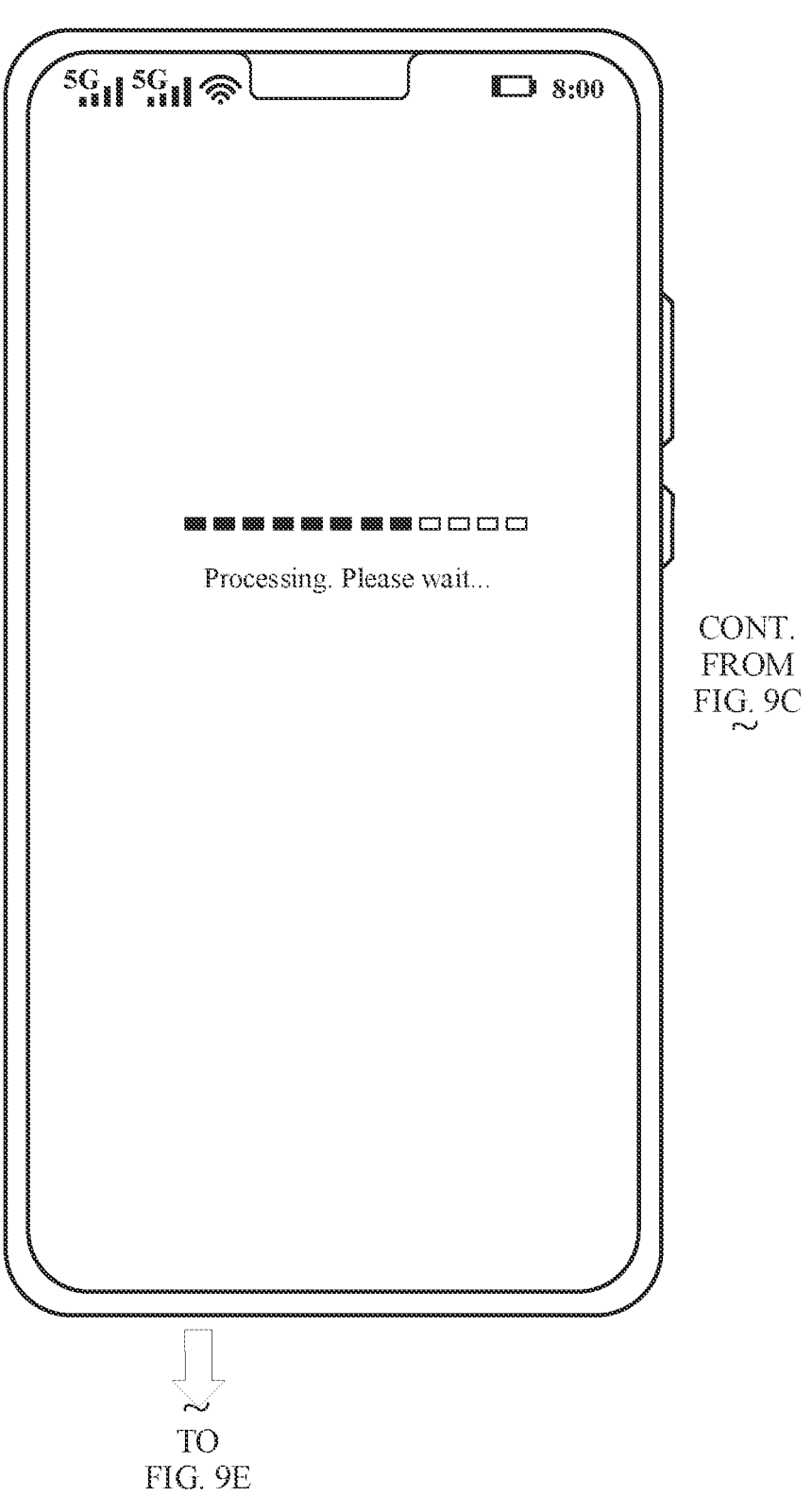
Figure 9E:
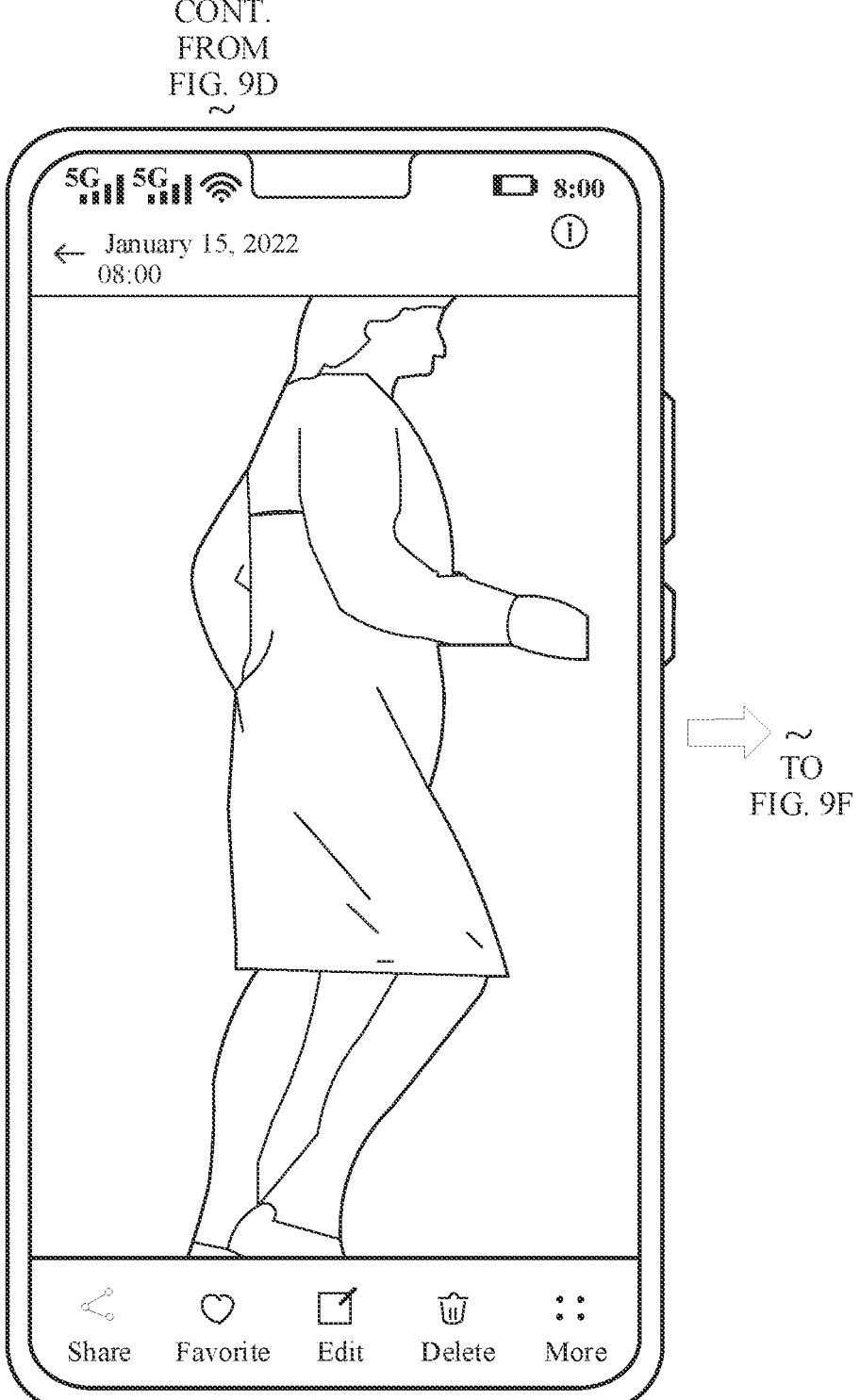
Figures 9E, 9F:
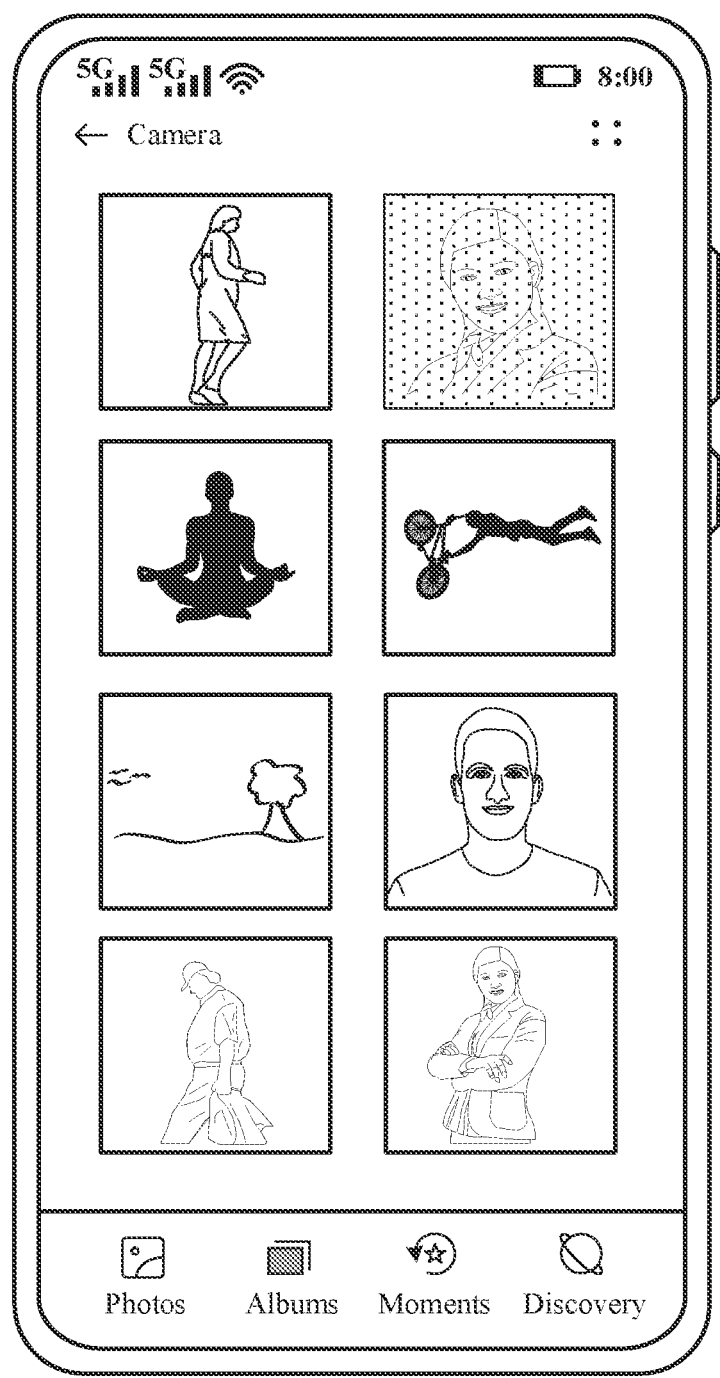

For example, FIG. 9A to FIG. 9F are other schematic diagrams of interfaces for performing a viewing operation on an image according to an embodiment of this application. As shown in FIG. 9A, the user taps a gallery app and enters an interface of the gallery app as shown in FIG. 9B. Then, the user taps a card of a specific album shown in FIG. 9B to enter an interface of the album. A plurality of thumbnails are displayed in the interface, as shown in FIG. 9C. Then, the user taps a specific thumbnail, that is, the user performs a viewing operation on the image (a target image) corresponding to the thumbnail. In response to the operation performed by the user, the electronic device determines whether the image corresponding to the thumbnail is an initial image. If the image corresponding to the thumbnail tapped by the user is an initial image, for example, the user taps a thumbnail 901 in FIG. 9B, the electronic device performs image post-processing on an initial image corresponding to the thumbnail 901. In an image post-processing process, an interface of the electronic device may be shown in FIG. 9D. After image post-processing is completed, a finished image is generated and displayed, as shown in FIG. 9E. In addition, the electronic device saves the finished image, replaces the thumbnail 901 of the initial image with a thumbnail of the finished image, and establishes a correspondence between the thumbnail of the finished image and the finished image. After performing the viewing operation, the user returns to the interface of the album, and the thumbnail in the interface is replaced with the thumbnail corresponding to the finished image, as shown in FIG. 9F.

If the image corresponding to the thumbnail is a finished image, the finished image is directly opened and displayed, as shown in FIG. 9E. Details are not described herein again.

Figure 10A:
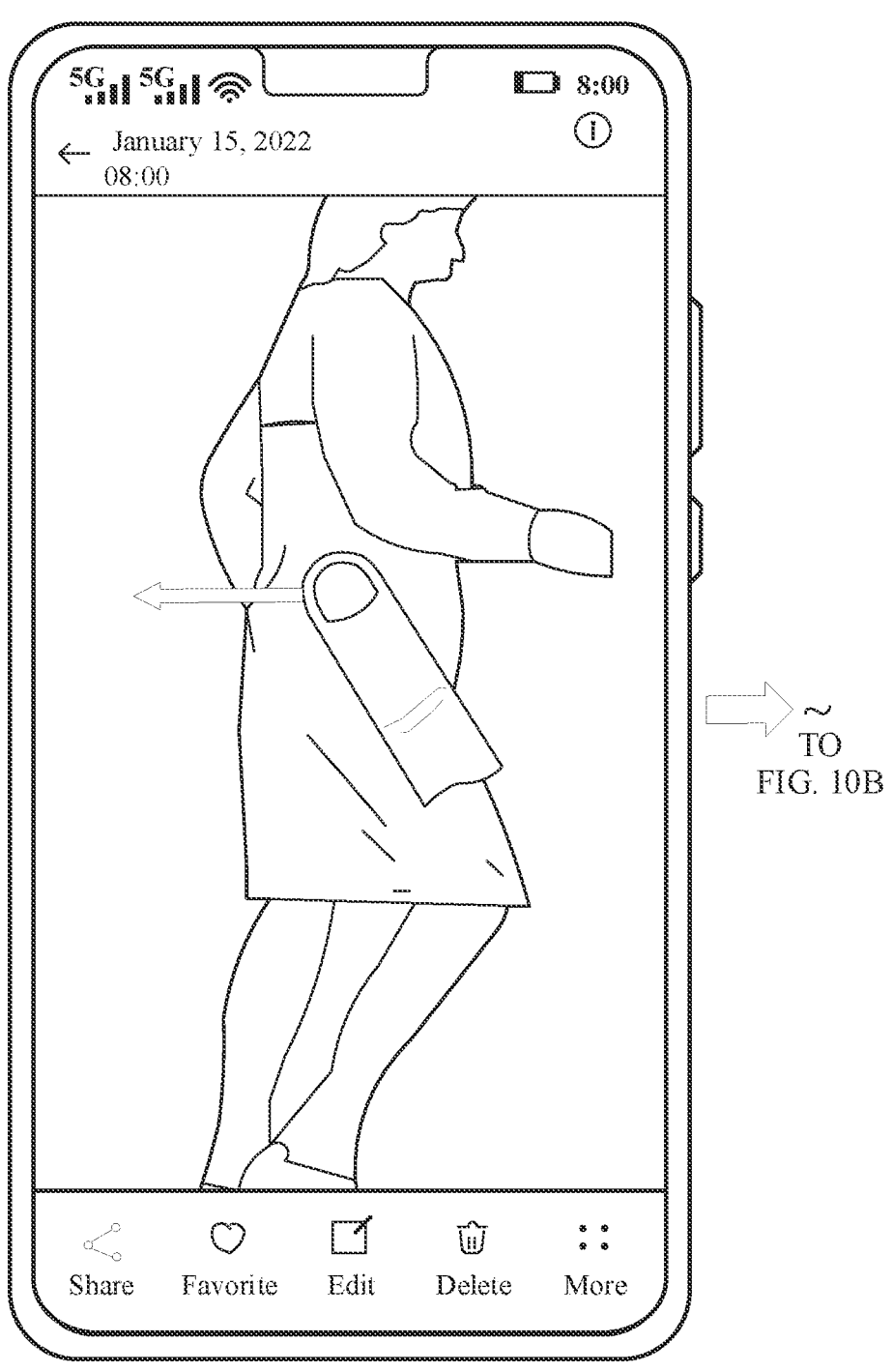
FIG. 10A to FIG. 10D are still other schematic diagrams of interfaces for performing a viewing operation on an image according to an embodiment of this application.
Figures 10A, 10B, 10C:
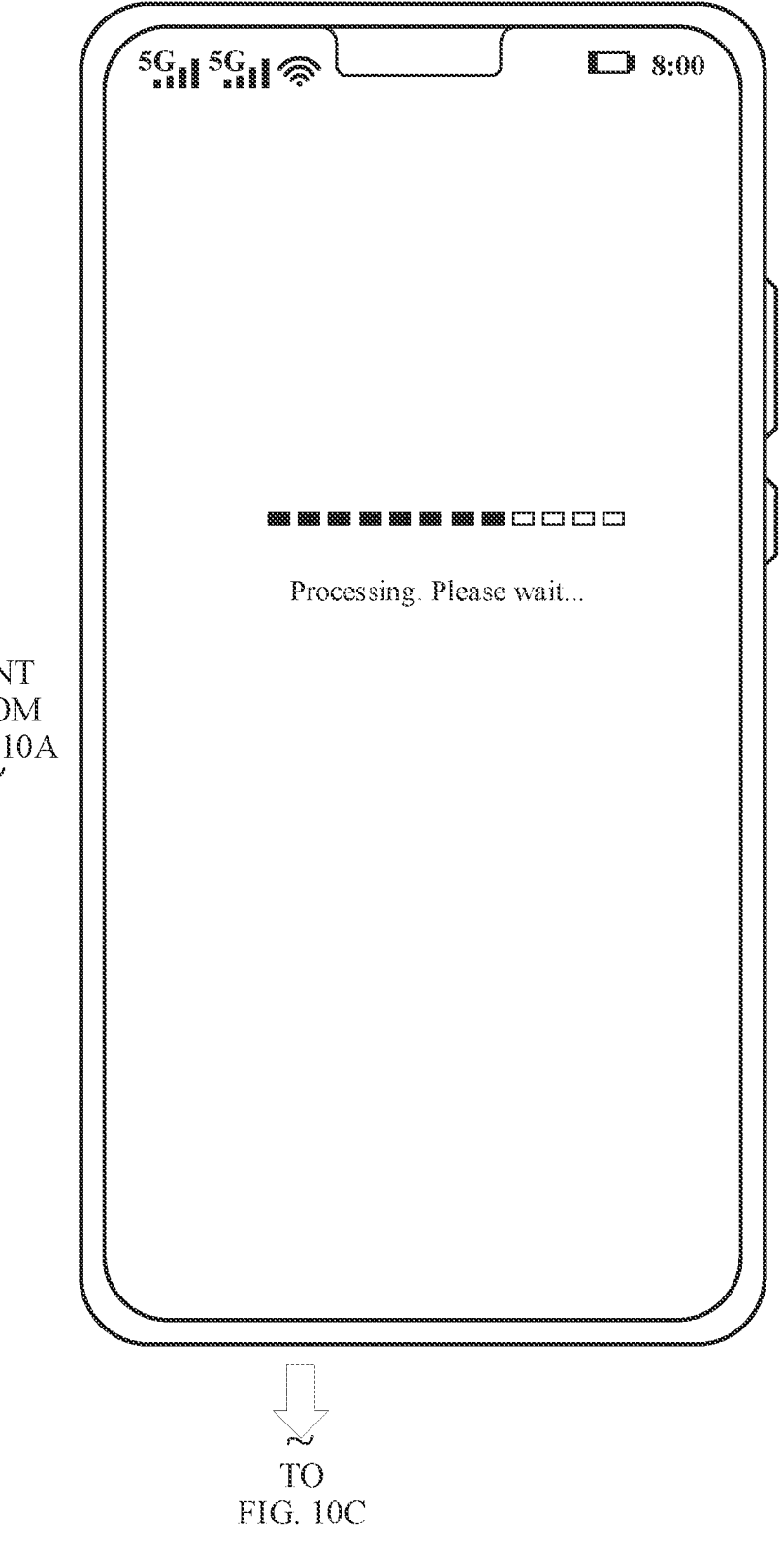
Figures 10B, 10C, 10D:
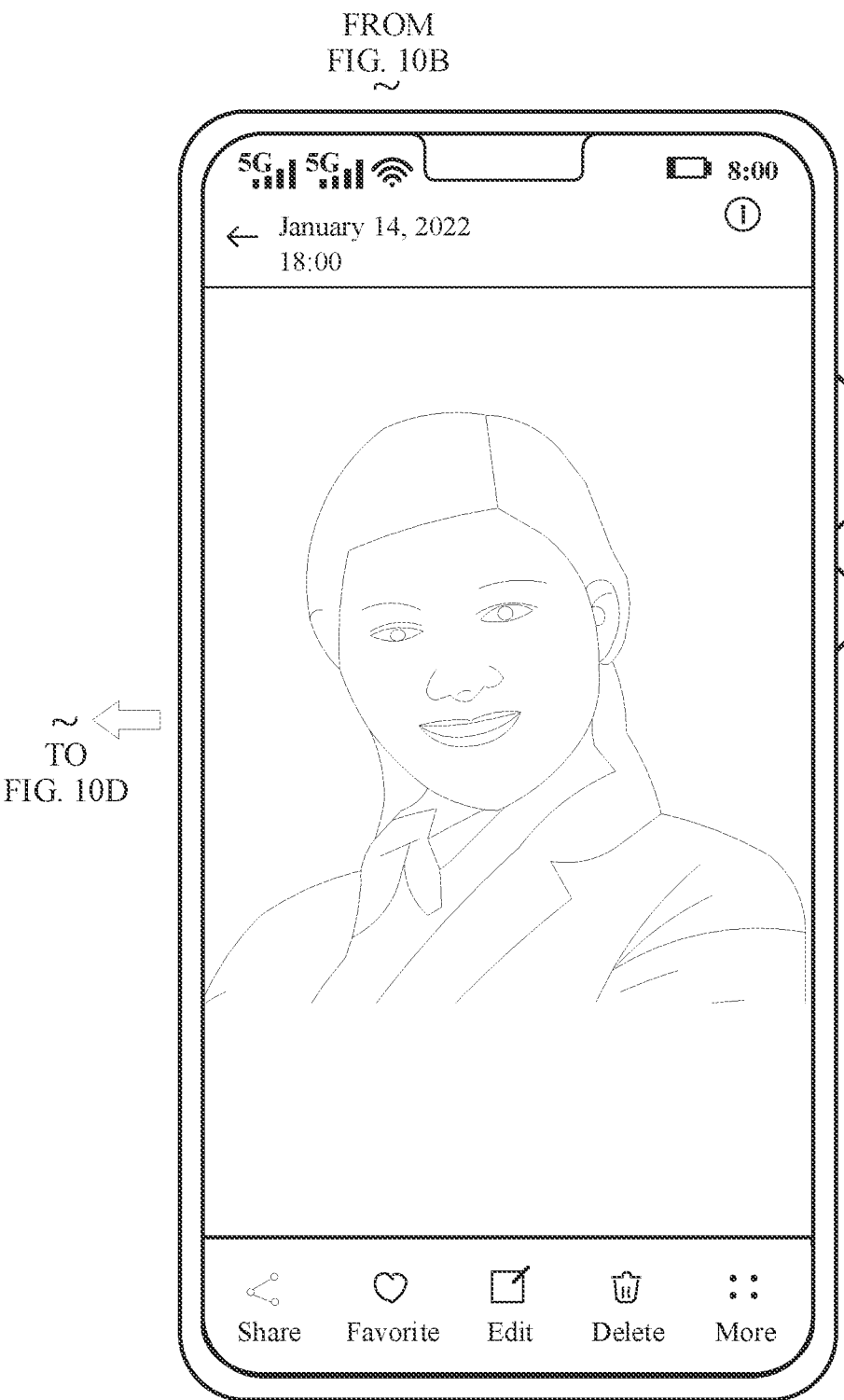
Figures 10C, 10D:
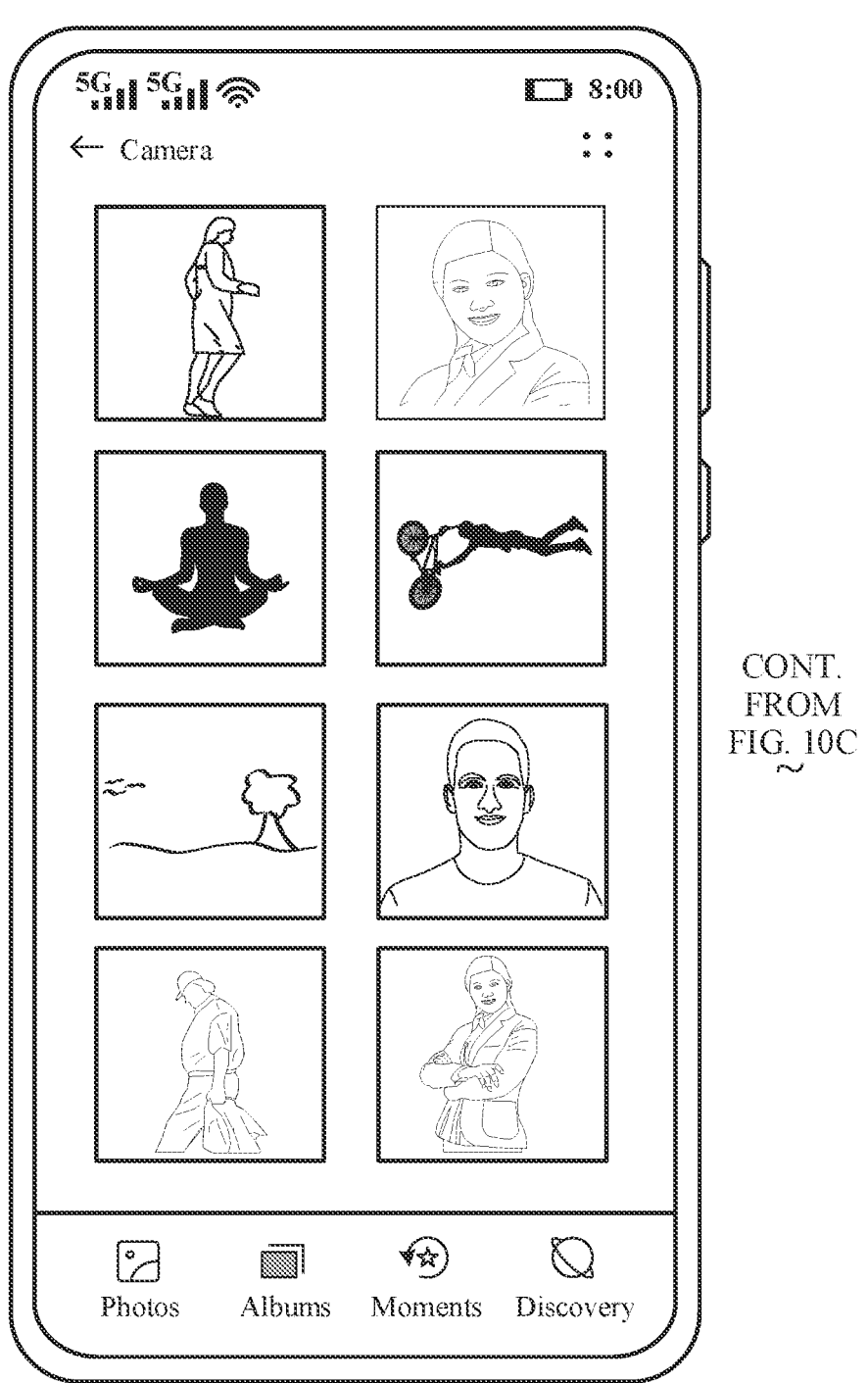

For example. FIG. 10A to FIG. 10D are still other schematic diagrams of interfaces for performing a viewing operation on an image according to an embodiment of this application. As shown in FIG. 10A, which is a continuation of FIG. 9E, after the electronic device displays the image corresponding to the thumbnail 901, an operation of swiping left is performed on a display interface of the image. The operation is an image viewing operation, and is used to view an image corresponding to a thumbnail 902 in FIG. 9C. In response to the operation of swiping left performed by the user, the electronic device determines that the image corresponding to the thumbnail 902 is an initial image, and performs image post-processing on the initial image. In an image post-processing process, an interface of the electronic device may be shown in FIG. 10B. After image post-processing is completed, a finished image is generated and displayed as shown in FIG. 10C. In addition, the electronic device saves the finished image, replaces the thumbnail 902 of the initial image with a thumbnail of the finished image, and establishes a correspondence between the thumbnail of the finished image and the finished image. Then, the user returns to the interface of the album, and the thumbnail in the interface is replaced with the thumbnail corresponding to the finished image, as shown in FIG. 10D.

Figure 11A:
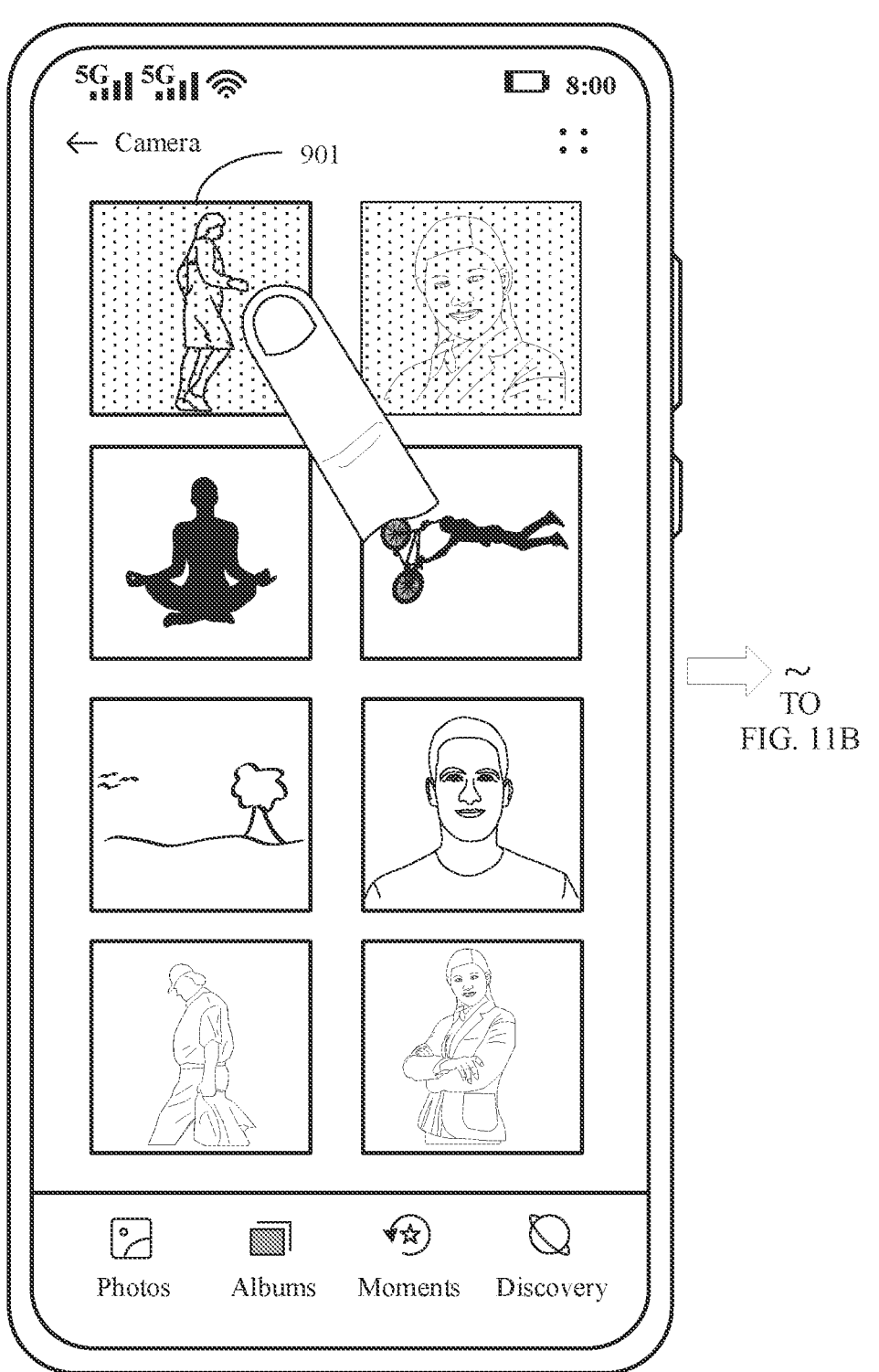
FIG. 11A to FIG. 11F are schematic diagrams of interfaces for performing a moving operation on an image according to an embodiment of this application.
Figures 11A, 11B, 11C:
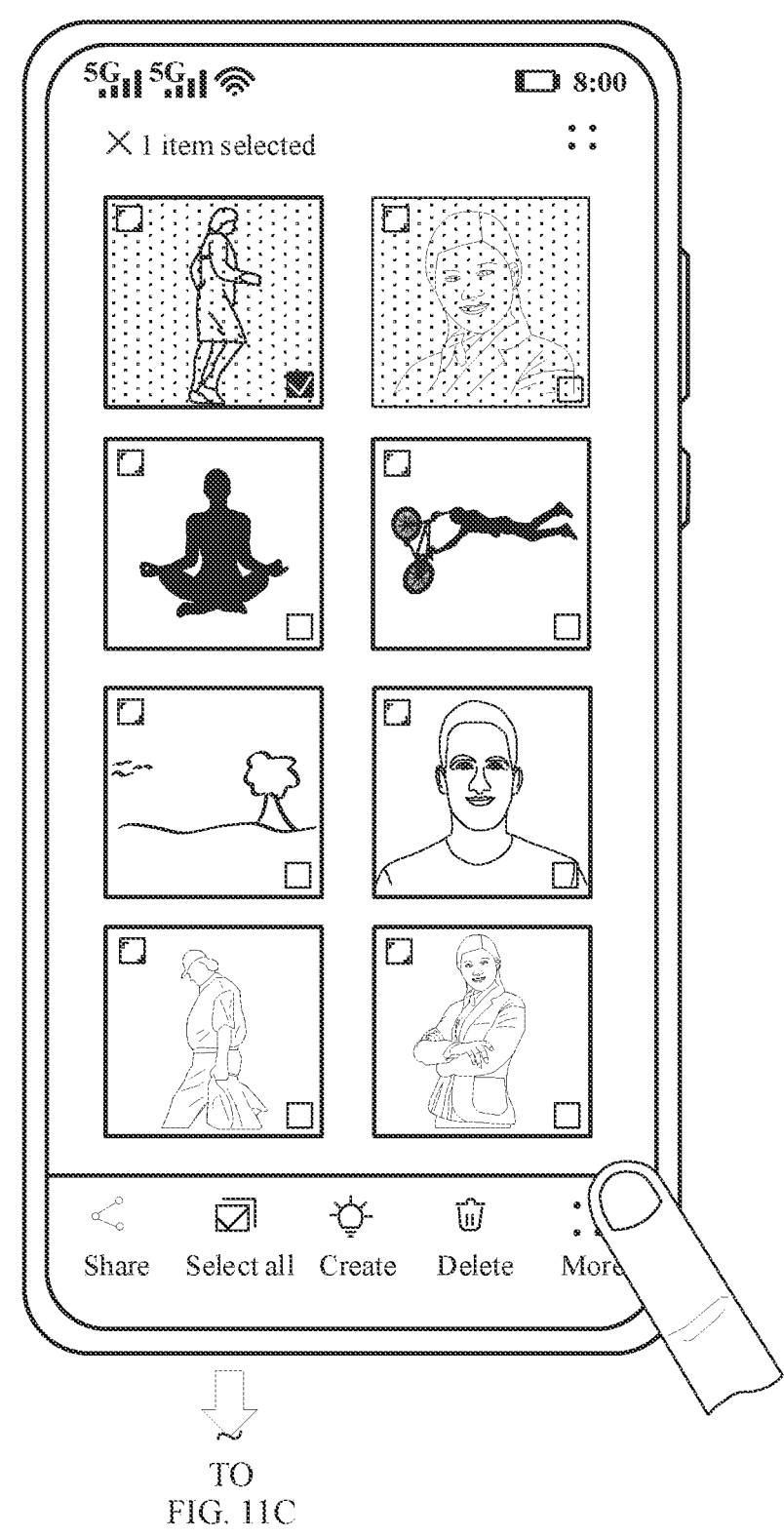
Figures 11B, 11C, 11D:
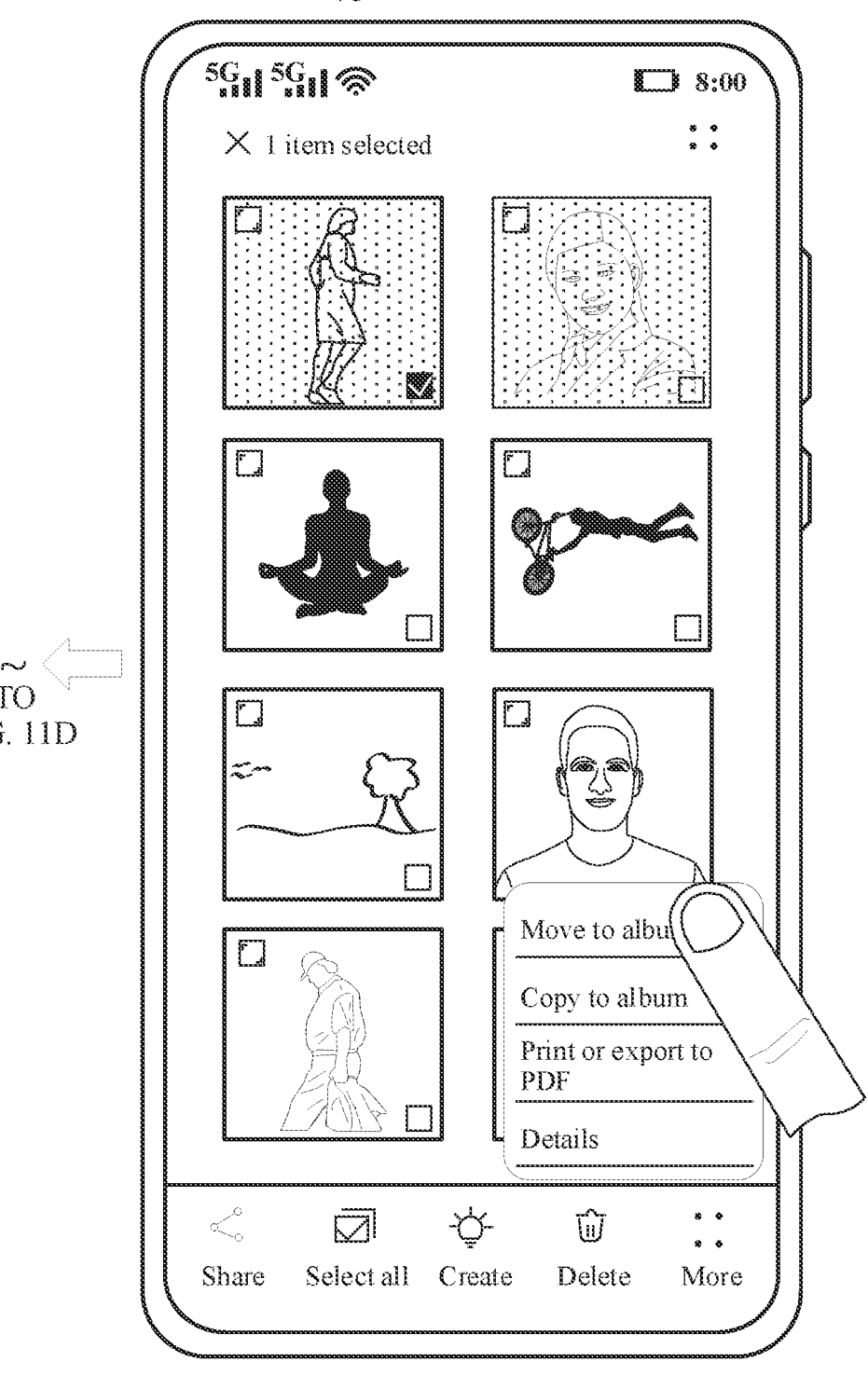
Figures 11C, 11D, 11E:
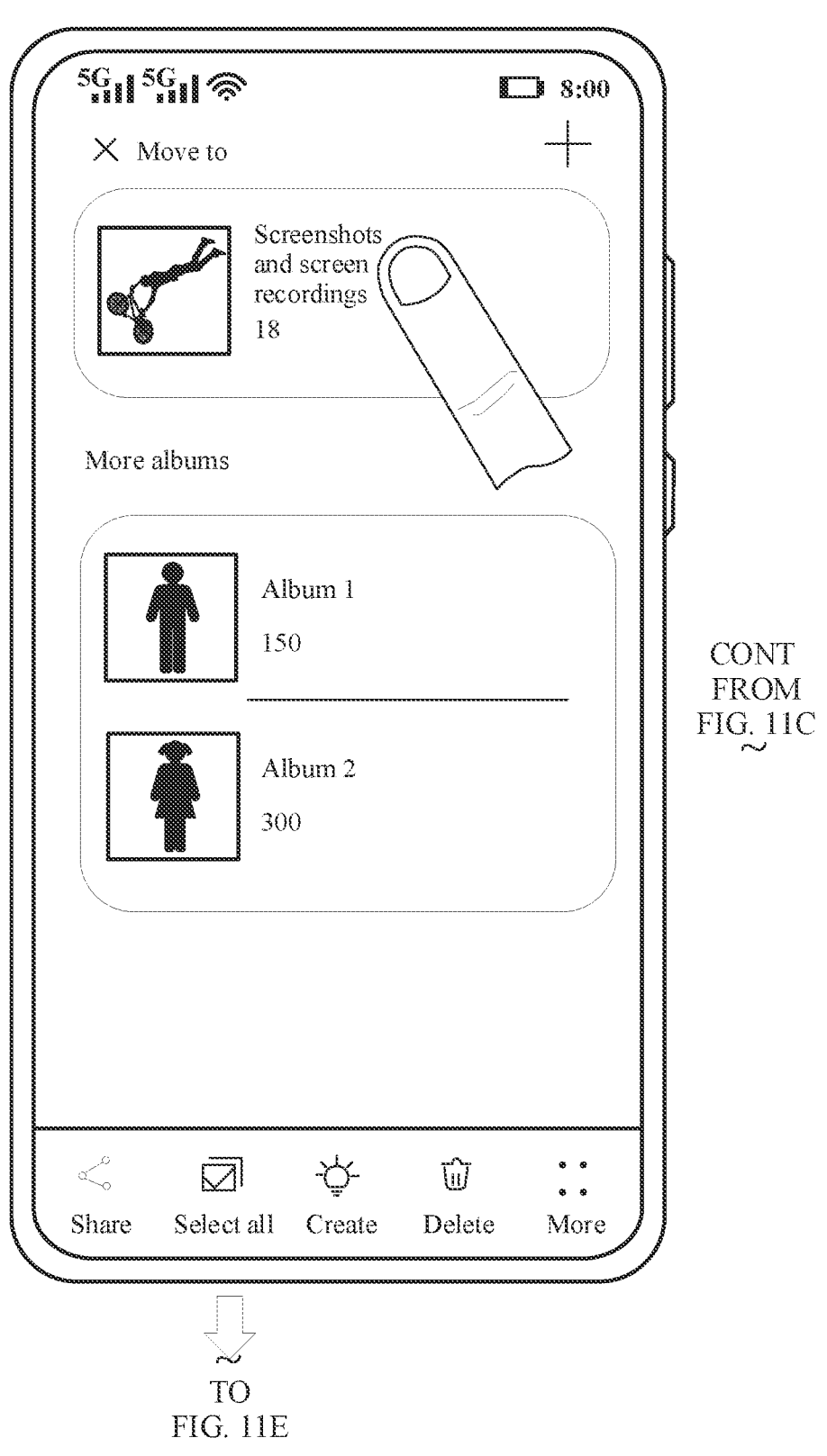
Figures 11D, 11E:
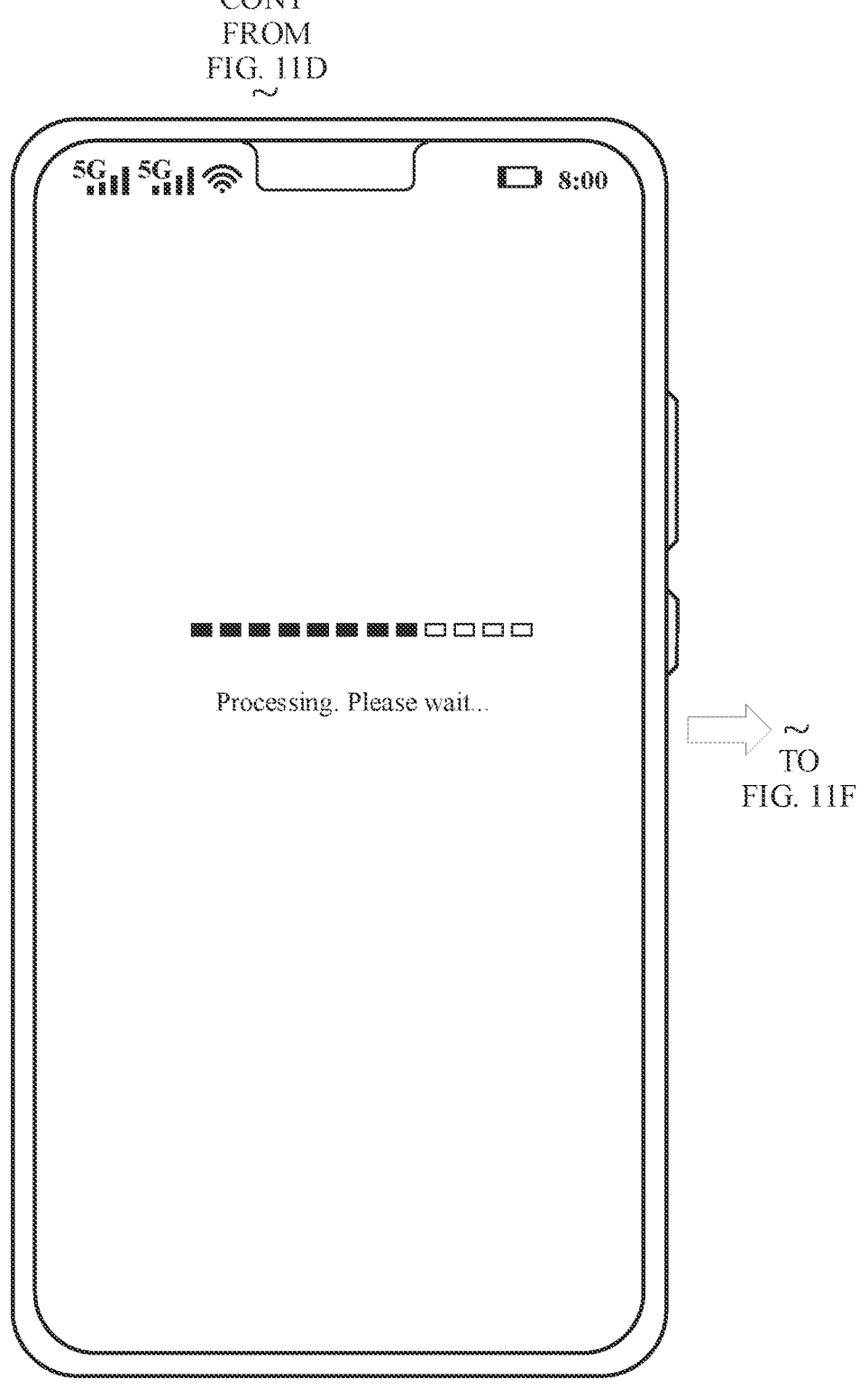
Figures 11E, 11F:
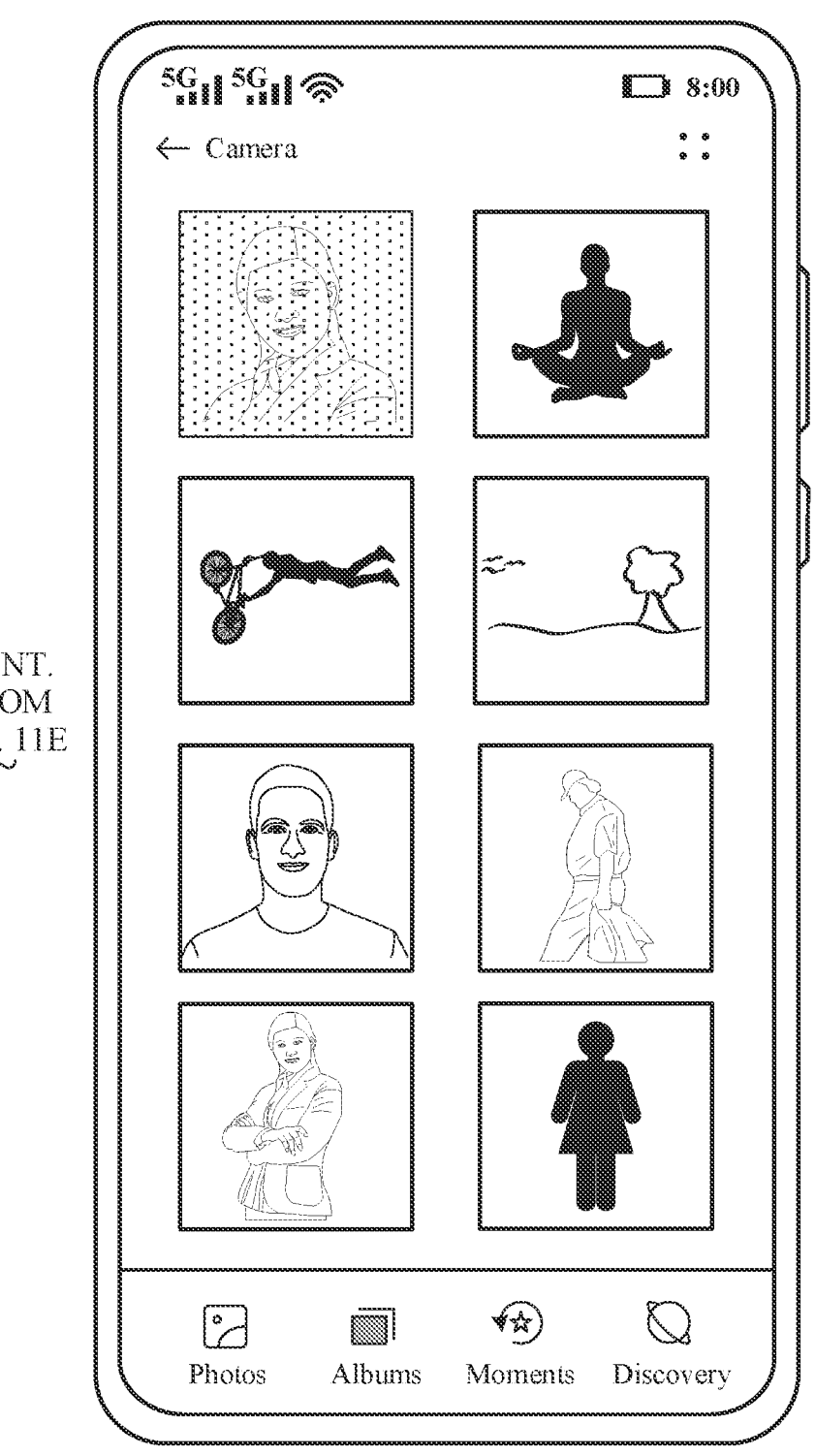

For example. FIG. 11A to FIG. 11F are schematic diagrams of interfaces for performing a moving operation on an image according to an embodiment of this application. As shown in FIG. 11A, a plurality of thumbnails are displayed in the interface of the album. When the user touches and holds the thumbnail 901, the thumbnail is selected and an interface shown in FIG. 11B is entered. Then, the user taps a "More" control in the interface shown in FIG. 10B to display an interface shown in FIG. 11C. If the user taps a "Move to album" option, an interface shown in FIG. 11D is entered. After the user selects a target album (for example, a screenshots and screen recordings album), if the electronic device determines that an image corresponding to the thumbnail selected by the user is an initial image, image post-processing is performed on the initial image. In an image post-processing process, an interface of the electronic device may be shown in FIG. 11E. After image post-processing is completed, a finished image is generated, and the finished image is cut and saved to the target album, so that a thumbnail of the finished image is generated, and a correspondence between the thumbnail and the finished image is established. Then, an interface shown in FIG. 11F is displayed.

Interfaces for performing an operation such as a sharing operation, a copying operation, or an editing operation in an image post-processing process of the target image are similar to the foregoing interfaces. Details are not described herein again.

(2) It is detected that the electronic device starts charging.

Figure 12:
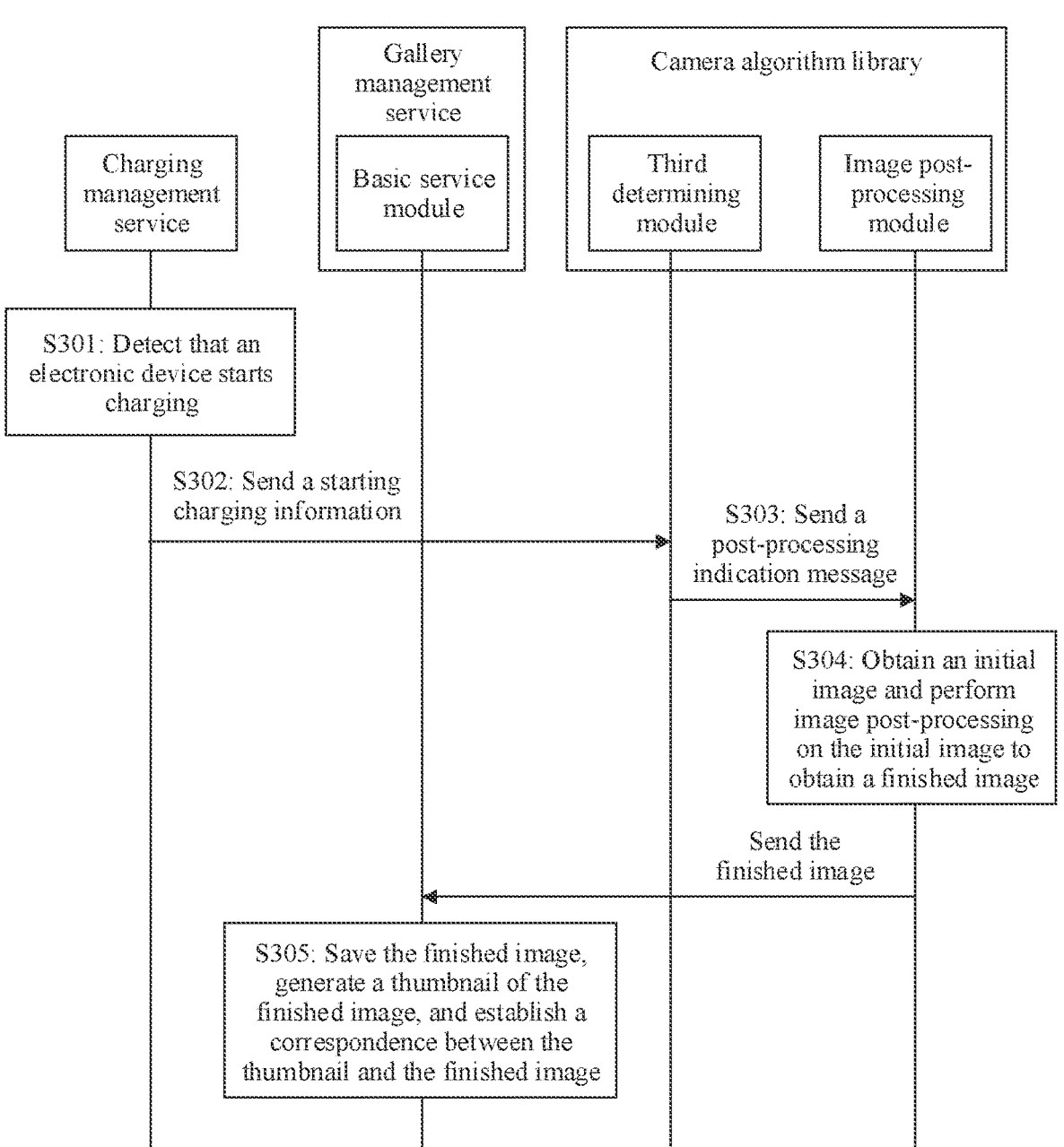
FIG. 12 is still another schematic flowchart of an image processing method according to an embodiment of this application.

For example. FIG. 12 is still another schematic flowchart of an image processing method according to an embodiment of this application. As shown in FIG. 12, the method includes the following steps.

S301: A charging management service detects that an electronic device starts charging.

Optionally, when a charger is plugged into the electronic device or the electronic device is close to a wireless charging transmission apparatus, the charging management service detects that the electronic device starts charging.

S302: The charging management service sends start charging information to a third determining module in a camera algorithm library, where the start charging information is used to represent that the electronic device starts charging.

S303: In response to the start charging information, the third determining module sends a post-processing indication message to an image post-processing module, where the post-processing indication message is used to indicate to perform image post-processing on an initial image.

S304: In response to the post-processing indication message, the image post-processing module obtains the initial image, performs image post-processing on the initial image to obtain a finished image, and sends the finished image to a basic service module in a gallery management service.

S305: The basic service module saves the finished image, generates a thumbnail of the finished image, and establishes a correspondence between the thumbnail and the finished image.

In this embodiment, when it is detected that the electronic device starts charging, image post-processing starts to be performed on the initial image to generate the finished image. After the electronic device starts charging, image post-processing is performed on the initial image in a timely manner, so that an image effect can be ensured when the user uses the image, and user experience can be improved.

(3) It is detected that a power level of an electronic device exceeds a second preset power level threshold.

Figure 13:
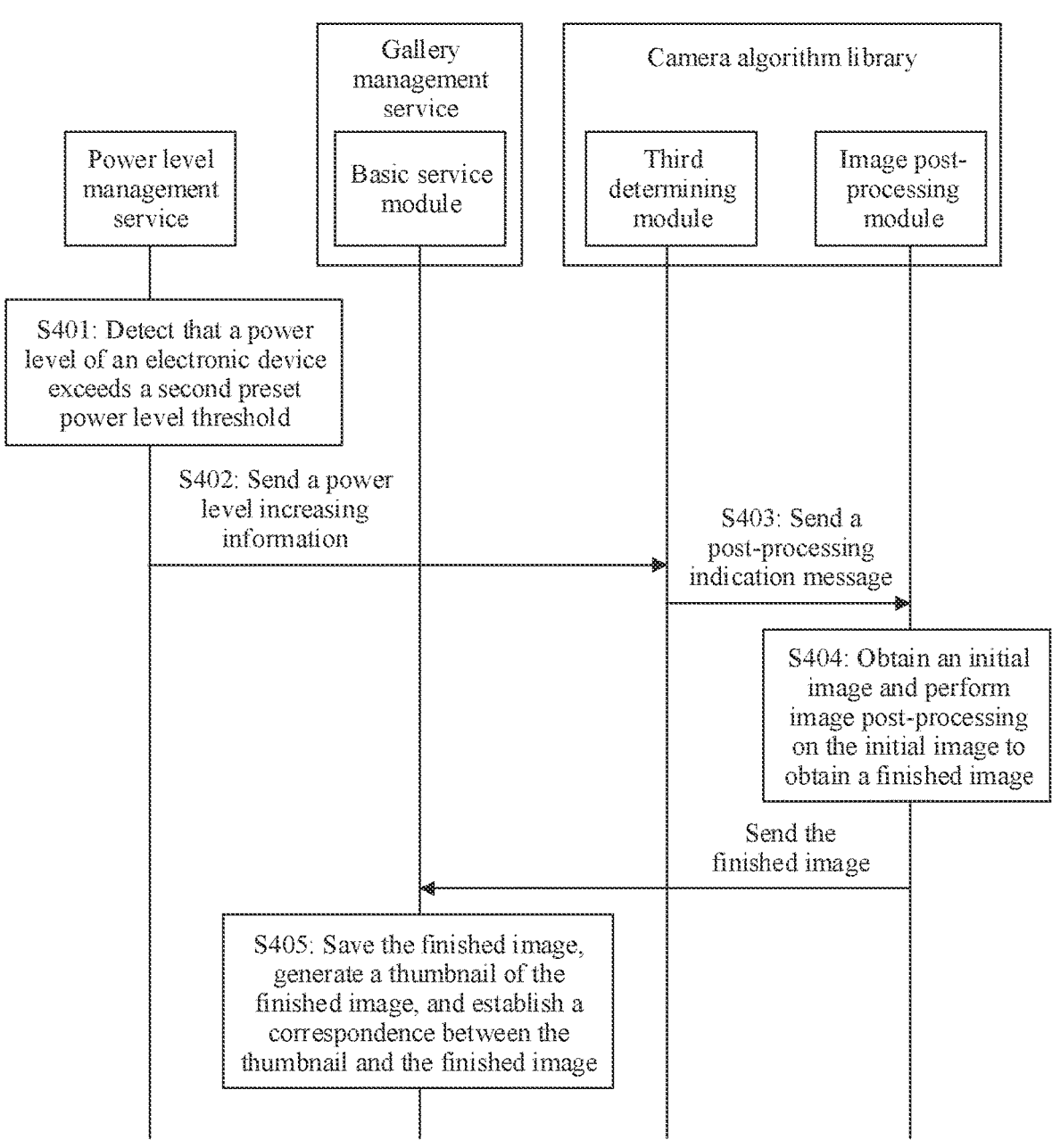
FIG. 13 is still another schematic flowchart of an image processing method according to an embodiment of this application.

For example, FIG. 13 is still another schematic flowchart of an image processing method according to an embodiment of this application. As shown in FIG. 13, the method includes the following steps.

S401: A power level management service detects that the power level of the electronic device exceeds a second preset power level threshold.

Optionally, the second preset power level threshold may be greater than a first power level threshold, for example, the second preset threshold may be 30%.

S402: The power level management service sends the power level increasing information to a third determining module of a camera algorithm library, where the power level increasing information is used to represent that the power level of the electronic device exceeds the second preset power level threshold.

S403: In response to the power level increasing information, the third determining module sends a post-processing indication message to an image post-processing module, where the post-processing indication message is used to indicate to perform image post-processing on an initial image.

S404: In response to the post-processing indication message, the image post-processing module obtains the initial image, performs image post-processing on the initial image to obtain a finished image, and sends the finished image to a basic service module in a gallery management service.

S405: The basic service module saves the finished image, generates a thumbnail of the finished image, and establishes a correspondence between the thumbnail and the finished image.

In this embodiment, when it is detected that the electronic device exceeds the second preset power level threshold, image post-processing starts to be performed on the initial image to generate a finished image. After the electronic device has a relatively high enough power level, image post-processing is performed on the initial image in a timely manner, so that battery life of the electronic device is not affected, an image displaying effect can be ensured when the user uses the image, and user experience can be improved.

It may be understood that in some embodiments, image post-processing on the initial image may alternatively be started when both a charging condition and a power level condition of the electronic device meet specific conditions. For example, when it is detected that the electronic device is charging and the power level exceeds a third preset power level threshold, image post-processing on the initial image is started. In this way, in a scenario in which the power level of the electronic device is low, but a charging condition of the user is limited and the electronic device cannot be charged to a high enough power level, post-processing on the initial image is not started, so that power is saved, battery life of the electronic device is prolonged, and user experience is improved. A trigger condition for the electronic device to start image post-processing on the initial image is not limited in this application and can be set based on an actual situation.

Embodiment 2

FIG. 14A, FIG. 14B, FIG. 15A and FIG. 15B each are still another schematic flowchart of an image processing method according to an embodiment of this application. As shown in FIG. 14A, FIG. 14B, FIG. 15A and FIG. 15B, the method includes the following steps.

S501: In response to a photo shooting operation performed by the user, a camera app obtains an initial image, and invokes a second determining module in a camera algorithm library.

S502: In response to invoking from the camera app, the second determining module in the camera algorithm library determines whether a power level of an electronic device is greater than a first preset power level threshold, and if no, performs step S503 or if yes, performs step S505.

S503: The second determining module obtains user habit information from a data management module of a gallery management service.

The user habit information is used to represent whether the user is accustomed to viewing an obtained image immediately after photo shooting is completed, that is, whether the user is accustomed to viewing a shot photo immediately after the photo shooting is completed.

Specifically, the data management module may obtain the user habit information by analyzing historical image data. The historical image data includes a time at which a historical image is obtained and a time at which a historical image is initially viewed. The historical image is an image obtained before a current moment. The time at which a historical image is obtained is a shooting time of the historical image. The time at which a historical image is initially viewed is a time at which the historical image is initially viewed by the user. It may be understood that the data management module may obtain the user habit information by analyzing historical image data in a preset historical time period. For example, the historical image data in the preset historical time period is historical image data in a time period of seven days that uses a current moment as an end moment, that is, historical image data in seven days before the current moment.

Figure 16:
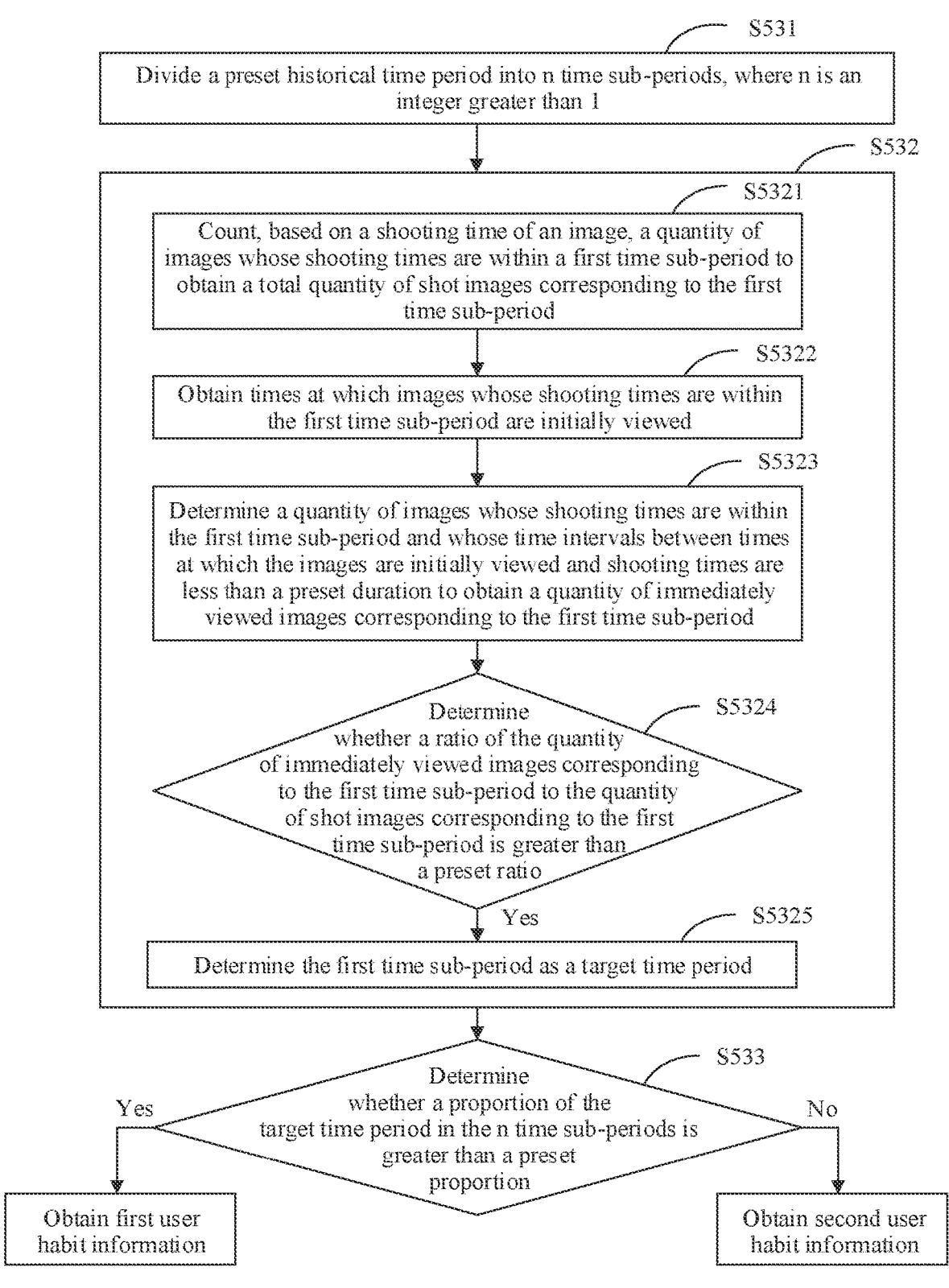
FIG. 16 is a schematic diagram of a process of obtaining user habit information according to an embodiment of this application.

In a specific embodiment, as shown in FIG. 16, the data management module obtains through analyzing, based on the following process, the user habit information.

S531: Divide a preset historical time period into n time sub-periods, where n is an integer greater than 1.

S532: For each time sub-period (the following uses a first time sub-period as an example, and the first time sub-period is any one of the n time sub-periods), perform the following steps to determine whether a time sub-period is a target time period.

S5321: Count, based on a shooting time of an image, a quantity of images whose shooting times are within the first time sub-period, to obtain a total quantity of shot images corresponding to the first time sub-period.

S5322: Obtain times at which images whose shooting times are within the first time sub-period are initially viewed.

S5323: Determine a quantity of images whose shooting times are within the first time sub-period and whose time intervals between times at which the images are initially viewed and shooting times are less than preset duration, to obtain a quantity of immediately viewed images corresponding to the first time sub-period. Optionally, the preset duration may be, for example, 5 minutes.

S5324: Determine whether a ratio of the quantity of immediately viewed images corresponding to the first time sub-period to the total quantity of shot images corresponding to the first time sub-period is greater than a preset ratio, and if yes, perform step S5325. Optionally, the preset ratio is, for example, 1:2.

S5325: Determine the first time sub-period as the target time period.

S533: Determine whether a proportion of a target time period in the n time sub-periods is greater than a preset proportion, and if yes, obtain first user habit information, where the first user habit information is used to represent that the user is accustomed to viewing a photo immediately after photo shooting is completed, or if no, obtain second user habit information, where the second user habit information is used to represent that the user is not accustomed to viewing a photo immediately after photo shooting is completed. Optionally, the preset proportion is, for example, 60%.

Optionally, the first user habit information may be implemented in a form of text, may be implemented in a form of assignment, or may be implemented in another manner. This is not limited in this embodiment of this application.

Figure 14A:
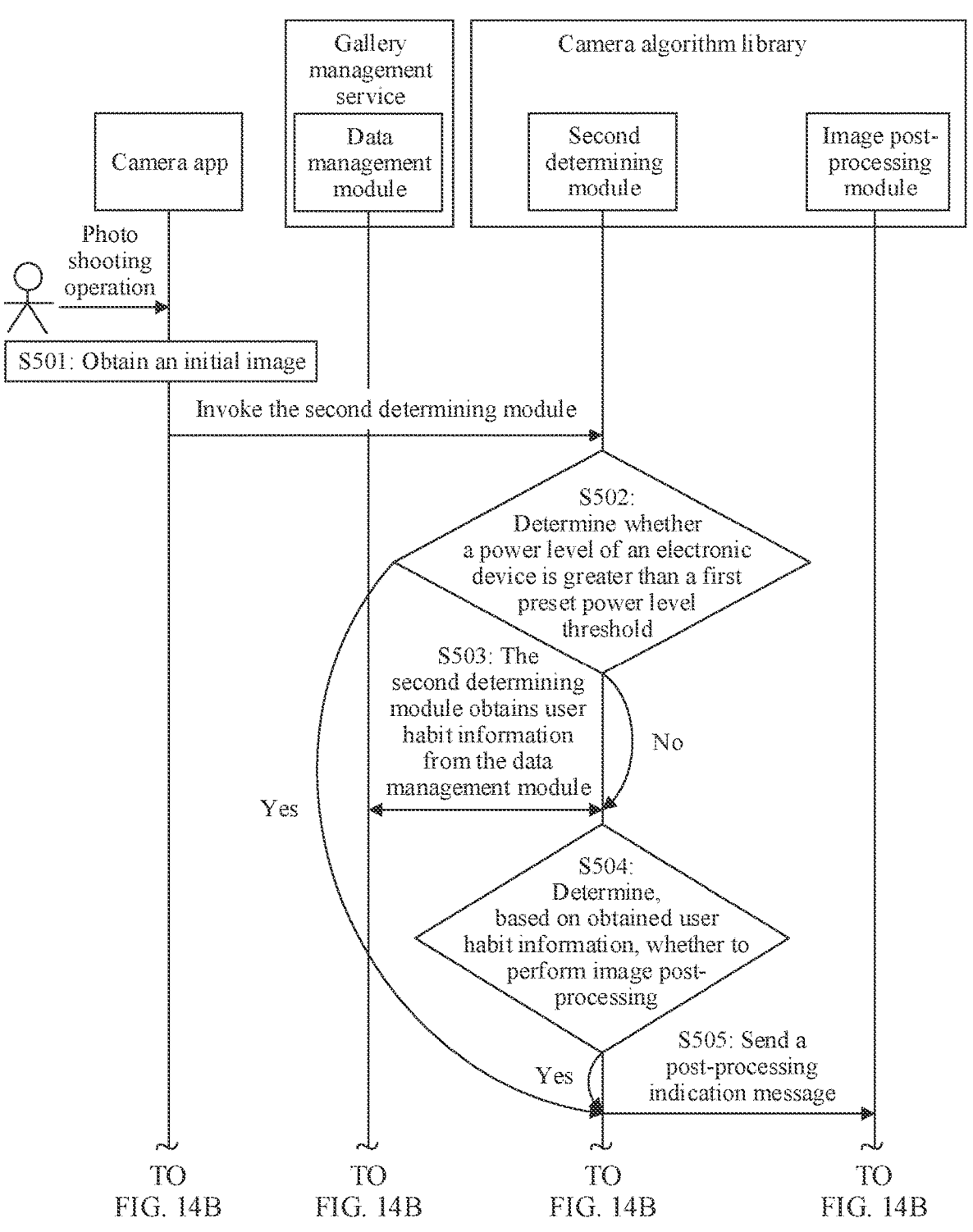
FIG. 14A and FIG. 14B are still other schematic flowcharts of an image processing method according to an embodiment of this application.
Figure 14B:
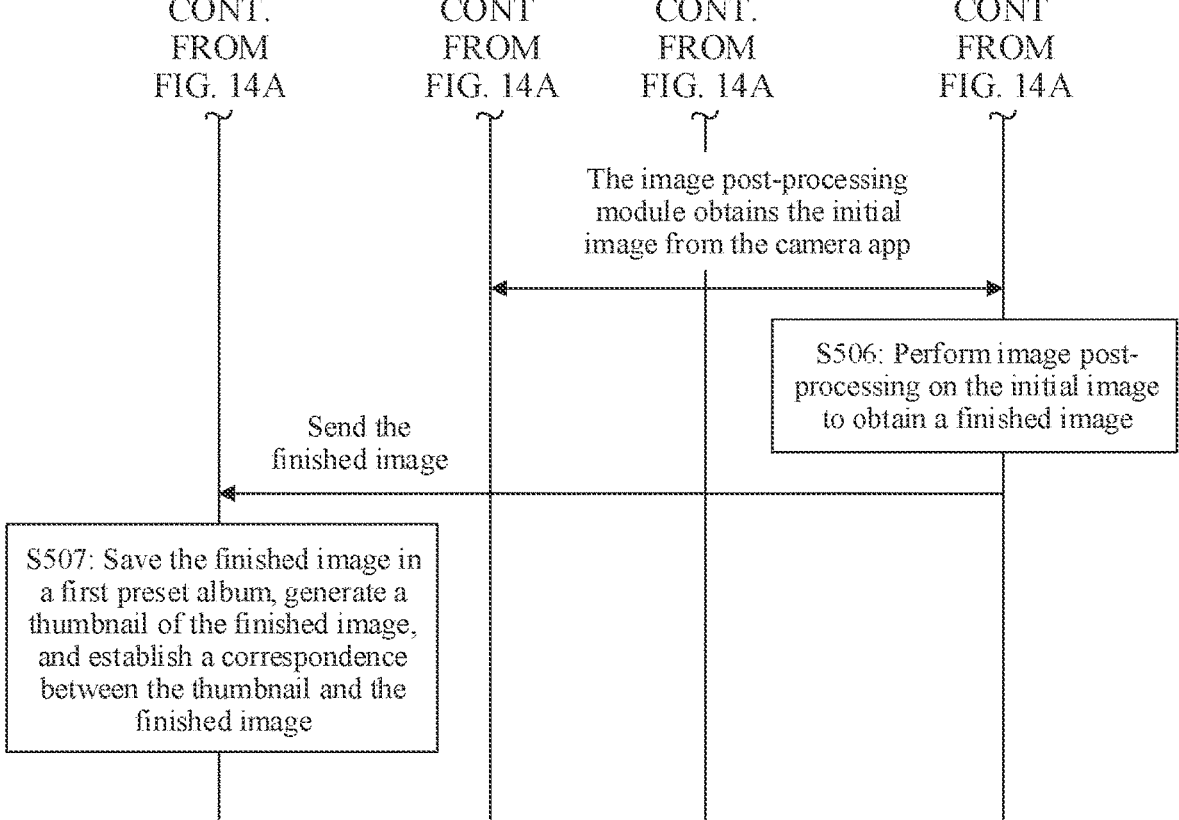
Figure 15A:
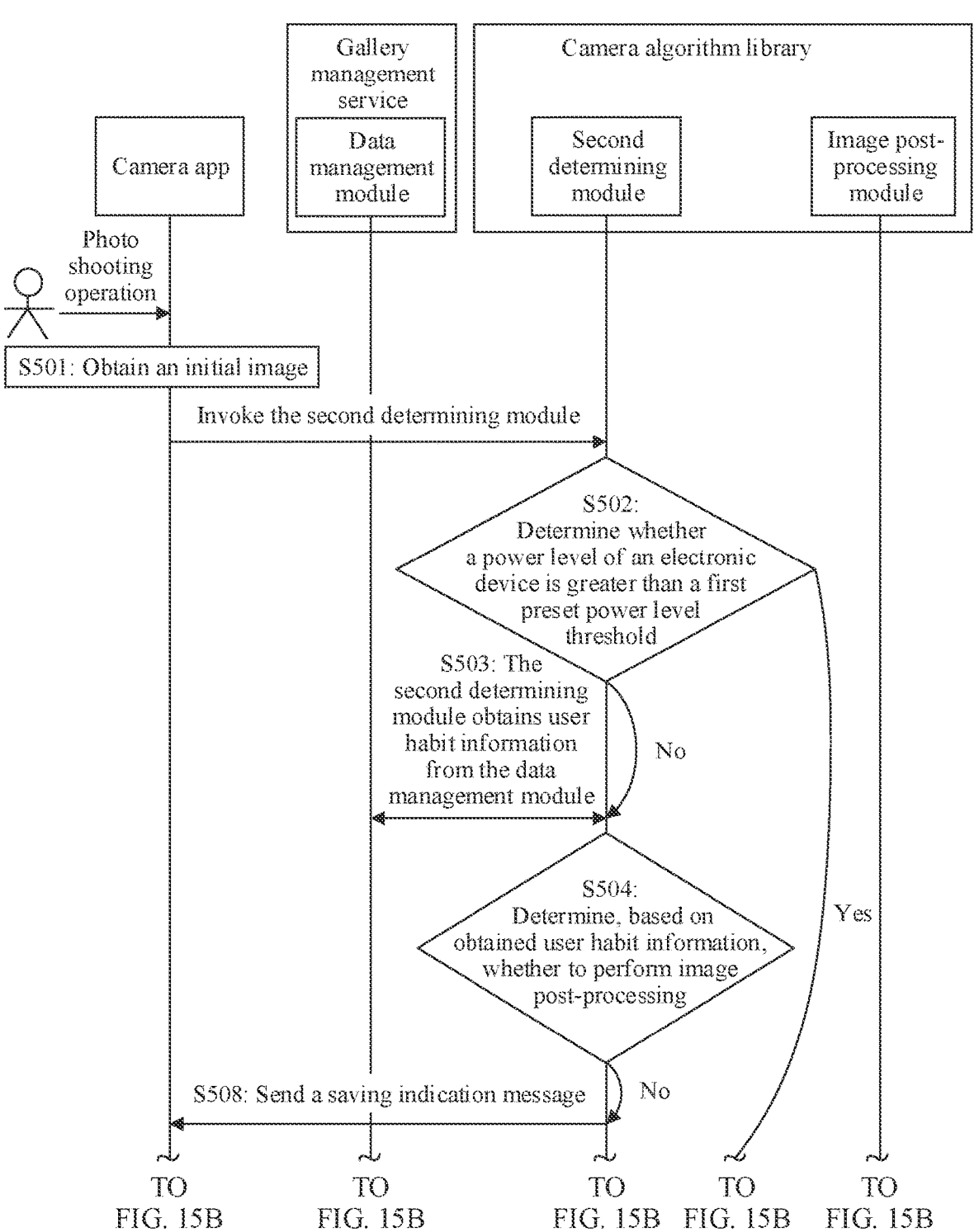
FIG. 15A and FIG. 15B are still other schematic flowcharts of an image processing method according to an embodiment of this application.
Figure 15B:
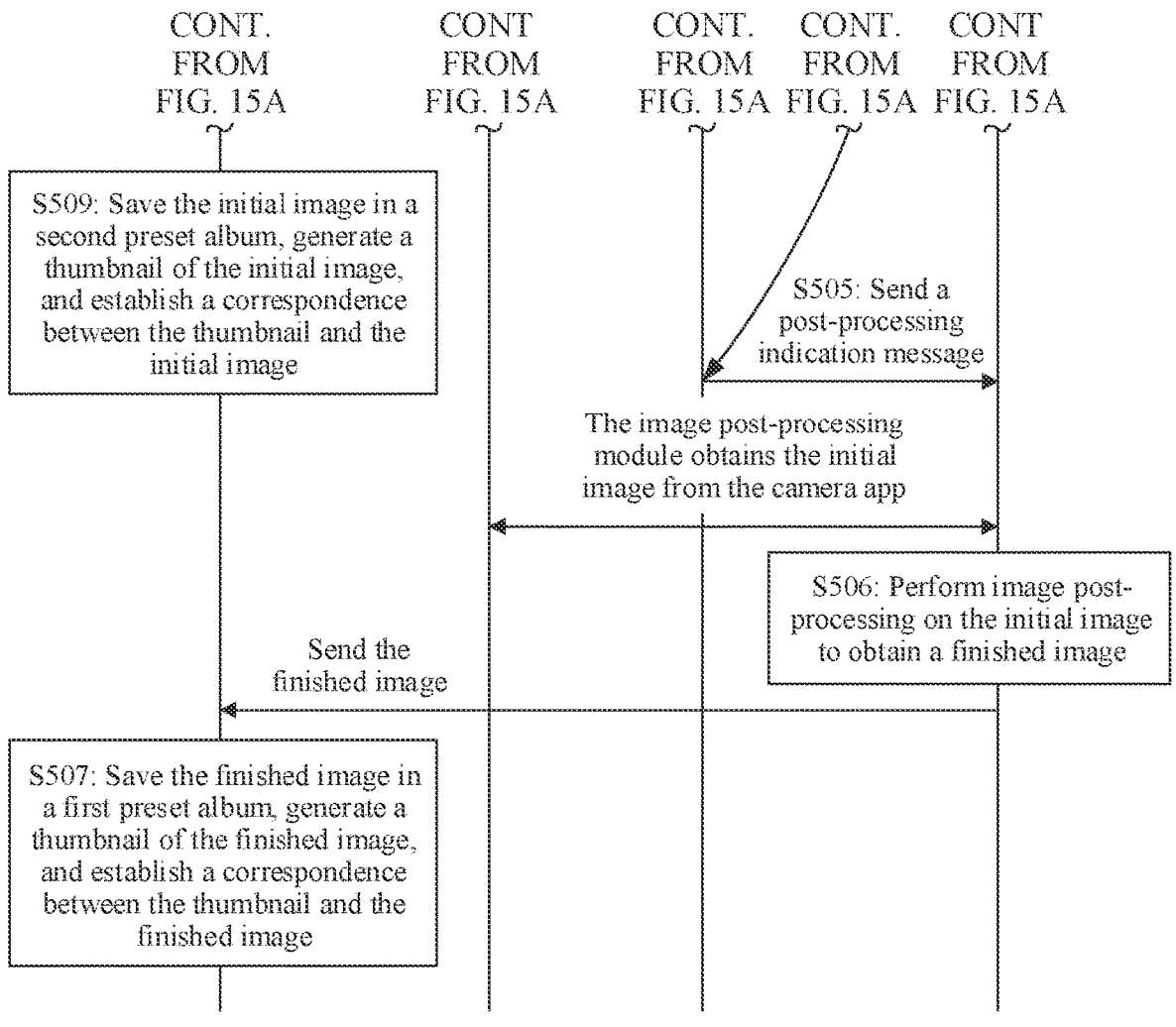

S504: The second determining module determines, based on obtained user habit information, whether image post-processing is to be performed, and if yes, performs step S505 (as shown in FIG. 14A), or if no, performs step S508 (as shown in FIG. 15A).

Specifically, if the user habit information is the first habit information, it is determined that image post-processing is to be performed. If the user habit information is the second habit information, it is determined that image post-processing is not to be performed.

S505: The second determining module sends a post-processing indication message to an image post-processing module, where the post-processing indication message is used to indicate to perform image post-processing on the initial image.

S506: In response to the post-processing indication message, the image post-processing module obtains the initial image from the camera app, performs image post-processing on the initial image to obtain a finished image, and sends the finished image to the camera app.

S507: The camera app saves the finished image in a first preset album, generates a thumbnail of the finished image, and establishes a correspondence between the thumbnail and the finished image.

S508: The second determining module sends a saving indication message to the camera app, where the saving indication message is used to indicate to save the initial image.

S509: The camera app saves the initial image in a second preset album, generates a thumbnail of the initial image, and establishes a correspondence between the thumbnail and the initial image.

It may be learned that a difference between the foregoing process and Embodiment 1 lies in that a determining condition the second determining module uses is different. The determining condition in this embodiment includes not only a power level, but also user habit information. When the power level of the electronic device is less than or equal to the first preset power level threshold, user habit information is further obtained, to determine whether the user is accustomed to viewing a shot photo immediately after photo shooting is completed. If the user is accustomed to viewing a shot photo immediately, image post-processing is directly performed on the initial image. If the user is not accustomed to viewing a photo immediately after photo shooting, image post-processing on the initial image is delayed. In this way, a use habit of the user is further considered while power consumption is reduced and battery life of the electronic device is prolonged, so that user experience is further improved.

In the foregoing process, the ratio of the quantity of immediately viewed images corresponding to the target time period to the total quantity of shot images corresponding to the target time period is greater than the preset ratio, and the target time period is a time period in which a probability of viewing an obtained image by the user immediately after photo shooting is completed is relatively high. The proportion of the target time period in the n time sub-periods is greater than the preset proportion, which indicates that the user is accustomed to viewing an obtained image immediately after photo shooting is completed. Therefore, the user habit information can be accurately determined by using a situation of the proportion of the target time period in the n time sub-periods, so as to be more consistent with the user habit during image processing and user experience can be further improved.

It may be understood that, after the initial image is saved based on a process of Embodiment 2, a trigger time for subsequent image post-processing on the initial image may be the same as that in Embodiment 1. Details are not described herein again.

The foregoing describes an example of the image processing method this embodiment in this application provides in detail. It may be understood that to implement the foregoing functions, the electronic device includes corresponding hardware and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments of this application, the electronic device may be divided into functional modules based on the foregoing method example. For example, the electronic device may be divided into functional modules corresponding to the functions, such as a detection unit, a processing unit, and a display unit; or two or more functions may be integrated into one module. The integrated module may be implemented in a form of hardware, or may be implemented in a form of a software functional module. It should be noted that division of the modules in embodiments of this application is an example, and is merely logical functional division. During actual implementation, there may be another division manner.

It should be noted that all related content of the steps in the foregoing method embodiments may be cited in function description of corresponding functional modules. Details are not described herein again.

The electronic device provided in this embodiment is configured to perform the foregoing image processing method, so that an effect that is the same as the foregoing implementation method may be achieved.

When an integrated unit is used, the electronic device may further include a processing module, a storage module, and a communication module. The processing module may be configured to control and manage an action of the electronic device. The storage module may be configured to support the electronic device in executing stored program code, data and the like. The communication module may be configured to support communication between the electronic device and another device.

The processing module may be a processor or a controller. The processor may implement or execute various example logical blocks, modules, and circuits described with reference to content disclosed in this application. The processor may also be a combination for implementing computing functions, for example, a combination of one or more microprocessors, a combination of a digital signal processor (digital signal processing. DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in embodiments may be a device having the structure shown in FIG. 2.

An embodiment of this application further provides a computer-readable storage medium. The computer-readable storage medium stores a computer program. When the computer program is executed by a processor, the processor is enabled to perform the image processing method in any one of the foregoing embodiments.

An embodiment of this application further provides a computer program product. When the computer program product is run on a computer, the computer is enabled to perform the foregoing related steps to implement the image processing method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer executable instructions stored in the memory, so that the chip performs the image processing method in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects in the corresponding method provided above. Details are not described herein again.

Based on the foregoing descriptions of the implementations, a person skilled in the art may clearly understand that, for the purpose of convenient and brief description, division into the foregoing functional modules is taken as an example for illustration. During actual application, the foregoing functions may be allocated to different functional modules for implementation based on a requirement. In other words, an inner structure of the apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic, mechanical, or another form.

The units described as separate parts may or may not be physically separated. A part displayed as a unit may be one or more physical units, that is, may be located at the one position, or may be distributed to different positions. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

The invention claimed is:

1. An image processing method, wherein the method is performed by an electronic device, and the method comprises:

determining user habit information, wherein the user habit information represents whether a user is accustomed to viewing an obtained image within preset duration after shooting is completed;

in response to a first operation from the user, obtaining a first image, wherein the first image is an image on which image post-processing has not been performed;

obtaining a power level of the electronic device; and when a preset condition is met, saving the first image, generating a first thumbnail, and establishing a correspondence between the first thumbnail and the first image, wherein the preset condition at least comprises that the power level of the electronic device is less than a first preset power level threshold, and wherein the preset condition further comprises that the user habit information is first information, wherein the first information represents that the user is not accustomed to viewing an obtained image within the preset duration after shooting is completed.

2. The method according to claim 1, wherein the determining user habit information comprises:

dividing a preset historical time period into n time sub-periods, wherein n is an integer greater than 1;

determining a quantity of target time periods in the n time sub-periods, wherein a ratio of a first quantity corresponding to the target time period to a second quantity corresponding to the target time period is greater than a first preset ratio, the first quantity corresponding to the target time period is a quantity of images whose shooting times are within the target time period and whose time intervals between times at which the images are initially viewed and shooting times are less than the preset duration, and the second quantity corresponding to the target time period is a total quantity of images whose shooting times are within the target time period; and when a ratio of the quantity of target time periods to n is less than or equal to a second preset ratio, determining that the user habit information is the first information; or when a ratio of the quantity of target time periods to n is greater than the second preset ratio, determining that the user habit information is second information, wherein the second information is used to represent that the user is accustomed to viewing an obtained image within the preset duration after shooting is completed.

3. The method according to claim 2, wherein the determining a quantity of target time periods in the n time sub-periods comprises:

performing first processing on each time sub-period to obtain a processing result corresponding to each time sub-period, wherein the processing result comprises that a time sub-period is the target time period, or that a time sub-period is not the target time period; and counting, based on the processing result corresponding to each time sub-period, the quantity of target time periods in the n time sub-periods, wherein the first processing comprises:

counting a total quantity of images whose shooting times are within a first time sub-period, to obtain a second quantity corresponding to the first time sub-period, wherein the first time sub-period is any one of the n time sub-periods;

obtaining times at which the images whose shooting times are within the first time sub-period are initially viewed;

determining a quantity of images whose shooting times are within the first time sub-period and whose time intervals between times at which the images are initially viewed and shooting times are less than the preset duration, to obtain a first quantity corresponding to the first time sub-period; and when a ratio of the first quantity corresponding to the first time sub-period to the second quantity corresponding to the first time sub-period is greater than the first preset ratio, determining that the first time sub-period is the target time period.

4. The method according to claim 1, wherein after the saving the first image, generating a first thumbnail, and establishing a correspondence between the first thumbnail and the first image, the method further comprises:

receiving a second operation performed by the user on the first image; and when a type of the second operation is one of preset types, performing image post-processing on the first image to obtain a second image, and processing the second image based on the type of the second operation; or when a type of the second operation is not any one of the preset types, processing the first image based on the type of the second operation.

5. The method according to claim 4, wherein the method further comprises:

displaying third information in a process of performing image post-processing on the first image, wherein the third information is used to represent that image post-processing is being performed on the first image.

6. The method according to claim 4, wherein the preset type comprises at least one of a viewing operation, a sharing operation, a moving operation, a copying operation, and an editing operation.

7. The method according to claim 4, wherein the receiving a second operation performed by the user on first image comprises:

displaying the first thumbnail; and receiving the second operation performed by the user on the first thumbnail.

8. The method according to claim 4, wherein after the performing image post-processing on the first image to obtain a second image, the method further comprises:

saving the second image, generating a second thumbnail, and establishing a correspondence between the second thumbnail and the second image.

9. The method according to claim 1, wherein after the saving the first image, generating a first thumbnail, and establishing a correspondence between the first thumbnail and the first image, the method further comprises:

performing image post-processing on the first image to obtain a second image, when it is detected that the electronic device starts charging, or that the power level of the electronic device is greater than a second preset power level threshold, or that the electronic device is in a charging state and the power level of the electronic device is greater than a third preset power level threshold.

10. An electronic device, comprising:

at least one processor; and one or more memories coupled to the at least one processor and storing programming instructions for execution by the at least one processor to cause the electronic device to:

determine user habit information, wherein the user habit information represents whether a user is accustomed to viewing an obtained image within preset duration after shooting is completed;

in response to a first operation from the user, obtain a first image, wherein the first image is an image on which image post-processing has not been performed;

obtain a power level of the electronic device; and when a preset condition is met, save the first image, generate a first thumbnail, and establish a correspondence between the first thumbnail and the first image, wherein the preset condition at least comprises that the power level of the electronic device is less than a first preset power level threshold, and wherein the preset condition further comprises that the user habit information is first information, wherein the first information represents that the user is not accustomed to viewing an obtained image within the preset duration after shooting is completed.

11. The electronic device according to claim 10, wherein the determining user habit information comprises:

dividing a preset historical time period into n time sub-periods, wherein n is an integer greater than 1;

determining a quantity of target time periods in the n time sub-periods, wherein a ratio of a first quantity corresponding to the target time period to a second quantity corresponding to the target time period is greater than a first preset ratio, the first quantity corresponding to the target time period is a quantity of images whose shooting times are within the target time period and whose time intervals between times at which the images are initially viewed and shooting times are less than the preset duration, and the second quantity corresponding to the target time period is a total quantity of images whose shooting times are within the target time period; and

when a ratio of the quantity of target time periods to n is less than or equal to a second preset ratio, determining that the user habit information is the first information; or when a ratio of the quantity of target time periods to n is greater than the second preset ratio, determining that the user habit information is second information, wherein the second information is used to represent that the user is accustomed to viewing an obtained image within the preset duration after shooting is completed.

12. The electronic device according to claim 11, wherein the determining a quantity of target time periods in the n time sub-periods comprises:

performing first processing on each time sub-period to obtain a processing result corresponding to each time sub-period, wherein the processing result comprises that a time sub-period is the target time period, or that a time sub-period is not the target time period; and counting, based on the processing result corresponding to each time sub-period, the quantity of target time periods in the n time sub-periods, wherein the first processing comprises:

counting a total quantity of images whose shooting times are within a first time sub-period, to obtain a second quantity corresponding to the first time sub-period, wherein the first time sub-period is any one of the n time sub-periods;

obtaining times at which the images whose shooting times are within the first time sub-period are initially viewed;

determining a quantity of images whose shooting times are within the first time sub-period and whose time intervals between times at which the images are initially viewed and shooting times are less than the preset duration, to obtain a first quantity corresponding to the first time sub-period; and when a ratio of the first quantity corresponding to the first time sub-period to the second quantity corresponding to the first time sub-period is greater than the first preset ratio, determining that the first time sub-period is the target time period.

13. The electronic device according to claim 10, wherein the programming instructions, when executed by the at least one processor, cause the electronic device to:

after the saving the first image, generating a first thumbnail, and establishing a correspondence between the first thumbnail and the first image, receive a second operation performed by the user on the first image; and when a type of the second operation is one of preset types, perform image post-processing on the first image to obtain a second image, and processing the second image based on the type of the second operation; or when a type of the second operation is not any one of the preset types, process the first image based on the type of the second operation.

14. The electronic device according to claim 13, the programming instructions, when executed by the at least one processor, cause the electronic device to:

display third information in a process of performing image post-processing on the first image, wherein the third information is used to represent that image post-processing is being performed on the first image.

15. The electronic device according to claim 13, wherein the preset type comprises at least one of a viewing operation, a sharing operation, a moving operation, a copying operation, and an editing operation.

16. The electronic device according to claim 13, wherein the receiving a second operation performed by the user on first image comprises:

displaying the first thumbnail; and receiving the second operation performed by the user on the first thumbnail.

17. The electronic device according to claim 13, wherein the programming instructions, when executed by the at least one processor, cause the electronic device to: after the performing image post-processing on the first image to obtain a second image, save the second image, generate a second thumbnail, and establish a correspondence between the second thumbnail and the second image.

18. A non-transitory computer-readable storage medium storing computer instructions, that when executed by one or more processors, cause an electronic device to:

determine user habit information, wherein the user habit information represents whether a user is accustomed to viewing an obtained image within preset duration after shooting is completed;

in response to a first operation from the user, obtain a first image, wherein the first image is an image on which image post-processing has not been performed;

obtain a power level of the electronic device; and when a preset condition is met, save the first image, generate a first thumbnail, and establish a correspondence between the first thumbnail and the first image, wherein the preset condition at least comprises that the power level of the electronic device is less than a first preset power level threshold, and wherein the preset condition further comprises that the user habit information is first information, wherein the first information represents that the user is not accustomed to viewing an obtained image within the preset duration after shooting is completed.

19. The non-transitory computer-readable storage medium according to claim 18, wherein the determining user habit information comprises:

dividing a preset historical time period into n time sub-periods, wherein n is an integer greater than 1;

determining a quantity of target time periods in the n time sub-periods, wherein a ratio of a first quantity corresponding to the target time period to a second quantity corresponding to the target time period is greater than a first preset ratio, the first quantity corresponding to the target time period is a quantity of images whose shooting times are within the target time period and whose time intervals between times at which the images are initially viewed and shooting times are less than the preset duration, and the second quantity corresponding to the target time period is a total quantity of images whose shooting times are within the target time period; and when a ratio of the quantity of target time periods to n is less than or equal to a second preset ratio, determining that the user habit information is the first information; or when a ratio of the quantity of target time periods to n is greater than the second preset ratio, determining that the user habit information is second information, wherein the second information is used to represent that the user is accustomed to viewing an obtained image within the preset duration after shooting is completed.

* * * * *